(12) United States Patent
Khurewattanakul et al.

(10) Patent No.: US 12,194,986 B2
(45) Date of Patent: *Jan. 14, 2025

(54) AUTONOMOUS VALET PARKING SYSTEM, AUTONOMOUS VALET PARKING PROGRAM PRODUCT, AND STORAGE MEDIUM

(71) Applicant: DENSO CORPORATION, Kariya (JP)

(72) Inventors: Sirinda Khurewattanakul, Kariya (JP);
Masashi Watanabe, Kariya (JP);
Shohei Hattori, Kariya (JP)

(73) Assignee: DENSO CORPORATION, Kariya (JP)

( * ) Notice: Subject to any disclaimer, the term of this patent is extended or adjusted under 35 U.S.C. 154(b) by 689 days.

This patent is subject to a terminal disclaimer.

(21) Appl. No.: 17/469,209

(22) Filed: Sep. 8, 2021

(65) Prior Publication Data

US 2021/0402989 A1    Dec. 30, 2021

Related U.S. Application Data

(63) Continuation of application No. PCT/JP2020/008676, filed on Mar. 2, 2020.

(30) Foreign Application Priority Data

Mar. 11, 2019 (JP) .................................. 2019-043673

(51) Int. Cl.
*B60W 30/06* (2006.01)
*B60R 25/01* (2013.01)
*B60R 25/24* (2013.01)

(52) U.S. Cl.
CPC ............. *B60W 30/06* (2013.01); *B60R 25/01* (2013.01); *B60R 25/24* (2013.01)

(58) Field of Classification Search
None
See application file for complete search history.

(56) References Cited

U.S. PATENT DOCUMENTS

2020/0209878 A1 *   7/2020   Shoda ................... B60W 10/20
2022/0032937 A1 *   2/2022   Antoniucci ........... B60W 50/12

FOREIGN PATENT DOCUMENTS

JP             2018041381 A       3/2018

* cited by examiner

*Primary Examiner* — Lail A Kleinman
(74) *Attorney, Agent, or Firm* — Harness, Dickey & Pierce, P.L.C.

(57) ABSTRACT

An autonomous valet parking system includes a terminal device, a vehicle, and a server device installed to a parking lot. When receiving a temporary key request from a server device, a terminal device verifies the request, generates a temporary key, and transmits the temporary key to a vehicle and the server device. The server device determines a target parking position of the vehicle, and transmits, to the vehicle, the temporary key and target position information. The vehicle verifies the temporary keys from the terminal device and the server device, generates a drive plan including a route to the target parking position, and transmits the drive plan to the server device. The server device verifies whether the drive plan is available, and notifies the vehicle. When the drive plan is verified to be available by the server device, the vehicle executes autonomous driving control according to the drive plan.

11 Claims, 14 Drawing Sheets

AUTONOMOUS VALET PARKING SYSTEM, AUTONOMOUS VALET PARKING PROGRAM PRODUCT, AND STORAGE MEDIUM

CROSS REFERENCE TO RELATED APPLICATIONS

The present application is a continuation application of International Patent Application No. PCT/JP2020/008676 filed on Mar. 2, 2020, which designated the U.S. and claims the benefit of priority from Japanese Patent Application No. 2019-043673 filed on Mar. 11, 2019. The entire disclosures of all of the above applications are incorporated herein by reference.

TECHNICAL FIELD

The present disclosure relates to an autonomous valet parking systems, an autonomous valet parking program product, and storage media each of which performs a valet parking by an autonomous driving control.

BACKGROUND

Conventionally, a valet parking system by autonomous driving control is known.

SUMMARY

The present disclosure provides an autonomous valet parking system including a terminal device, a vehicle, and a server device installed to a parking lot. The terminal device, the vehicle, and the server device are configured to transmit and receive data to and from one another. The server generates a temporary key request requesting the terminal device to generate a temporary key and transmits the temporary key request to the terminal device. In response to a reception of the temporary key request transmitted from the server device, the terminal device verifies the temporary key request. The terminal device generates the temporary key in response to a verification result of the temporary key request being true, and transmits the temporary key to the vehicle and the server device. In response to a reception of the temporary key transmitted from the terminal device, the server device determines a target parking position of the vehicle, and transmits, to the vehicle, the temporary key and target position information indicating the determined target parking position. In response to a reception of the temporary keys transmitted from the terminal device and the server device, the vehicle verifies the temporary key transmitted from the terminal device and the temporary key transmitted from the server device. In response to verification results of the temporary keys being true, the vehicle generates a drive plan including a route to the target parking position based on the target position information, and transmits the drive plan to the server device. In response to a reception of the drive plan transmitted from the vehicle, server device verifies whether the drive plan is available, and transmits, to the vehicle, available information indicating that the drive plan is available when the drive plan is verified to be available. In response to a reception of the available information transmitted from the server device, the vehicle executes the autonomous driving control of according to the drive plan.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
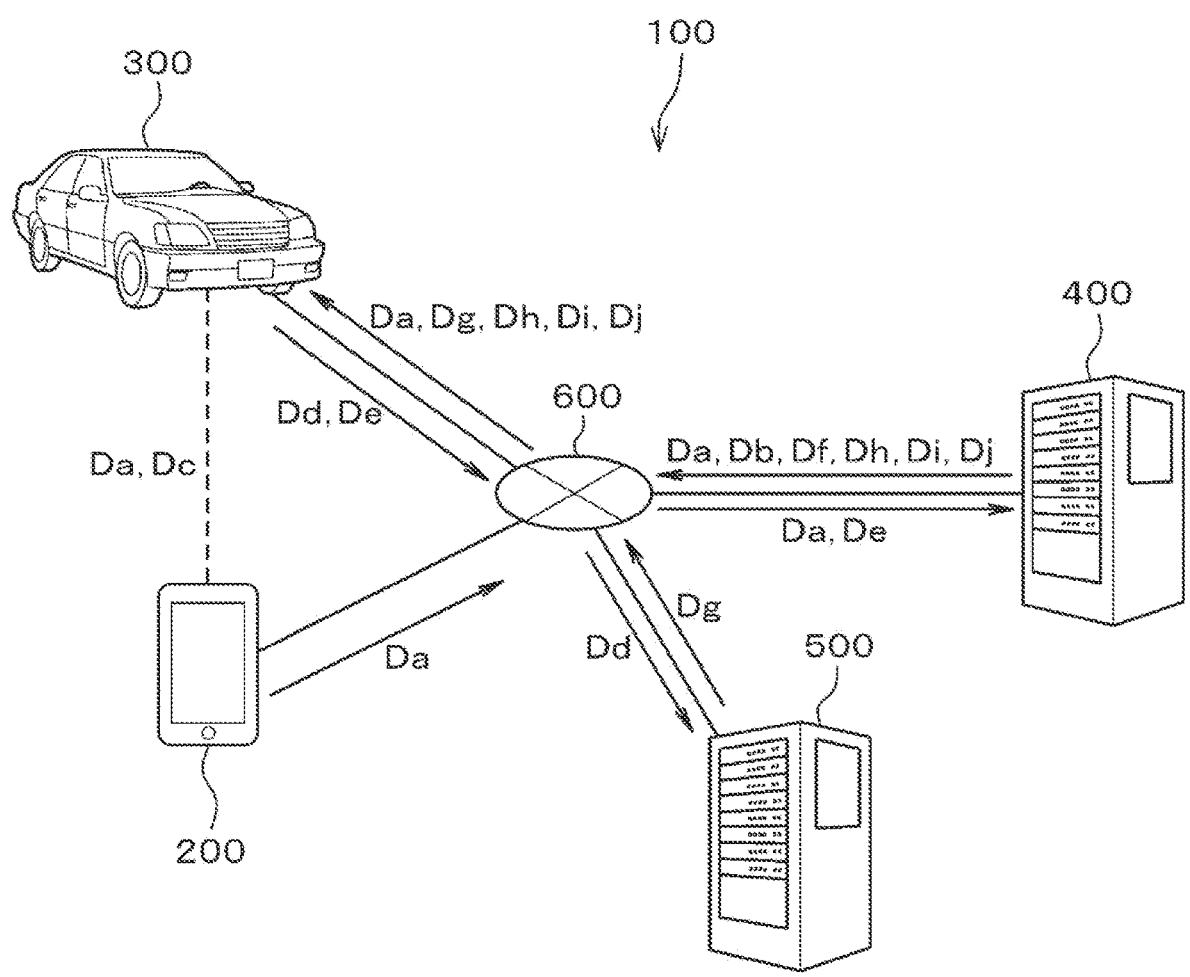
FIG. 1 is a diagram illustrating an overall configuration of an autonomous valet parking system according to a first embodiment of the present disclosure.

Before describing embodiments of the present disclosure, a conventional valet parking system by autonomous driving control will be described. Hereinafter, the valet parking system by autonomous driving control will also be referred to as an autonomous valet parking system. In a conventional technique, a driving plan created by a server device such as a management server installed to the parking lot is transmitted to the vehicle. In this configuration, a validity of the driving plan is verified by using a temporary key and a valid range, and then the autonomous driving control of the vehicle is carried out.

As autonomous valet parking systems, a system mainly with a parking lot side equipment built on the parking lot side (hereinafter, also referred to as a parking lot infrastructure oriented system) and a system mainly with a vehicle side equipment such as an automobile (hereinafter, also referred to as a vehicle infrastructure oriented system) are known.

In a system oriented to the parking lot infrastructure, a server device is required to be installed to the parking lot, and high-precision sensors such as cameras and radars are required to be installed to the parking lot. This may increase an equipment burden and cost on the parking lot side. In a system oriented to the parking lot infrastructure, it is necessary to mount a device on the vehicle so that the device can transmit and receive data to and from a server device installed to the parking lot and verify various kinds of information on the vehicle side.

In a system oriented to the vehicle, at least a server device needs to be provided on the parking lot side, and high-precision sensors are not compulsory on the parking lot side. Therefore, in the vehicle oriented system, the equipment burden and cost on the parking lot side can be reduced. In the vehicle oriented system, the vehicle needs to be provided with sensors and control devices with higher accuracies than those of the parking lot infrastructure oriented system. These sensors and control devices provided to the vehicle are used to carry out the autonomous driving control. In the autonomous valet control, since it is possible to employ those sensors and control devices provided, in advance, for the autonomous driving control of the vehicle, the increase in equipment burden and cost for implementing the autonomous vale function on the vehicle side can be significantly suppressed.

As described above, the vehicle oriented system can reduce the equipment burden and cost on the parking lot side as compared with the parking lot infrastructure oriented system. The above-described system in the conventional art is the parking lot infrastructure oriented system, and although it is possible to enhance a safety of such a system, it cannot be applied to the vehicle oriented system.

According to an aspect of the present disclosure, an autonomous valet parking system executing a valet parking by an autonomous driving control is provided. The autonomous valet parking system includes: a terminal device; a vehicle; and a server device installed to a parking lot. The terminal device, the vehicle, and the server device are configured to transmit and receive data to and from one another. The terminal device includes a key request verification unit and a temporary key generation unit. The vehicle includes a key verification unit, a drive planning unit, and an autonomous driving control unit. The server device includes a key request generation unit, a parking position determination unit, and a plan verification unit.

The key request generation unit generates a temporary key request requesting the terminal device to generate a temporary key and transmits the temporary key request to the terminal device. In response to a reception of the temporary key request transmitted from the server device, the key request verification unit verifies the temporary key request. The temporary key generation unit generates the temporary key in response to a verification result of the temporary key request by the key request verification unit being true, and transmits the temporary key to the vehicle and the server device. In response to a reception of the temporary key transmitted from the terminal device, the parking position determination unit determines a target parking position of the vehicle, and transmits, to the vehicle, the temporary key and target position information indicating the determined target parking position.

In response to a reception of the temporary keys transmitted from the terminal device and the server device, the key verification unit verifies the temporary key transmitted from the terminal device and the temporary key transmitted from the server device. In response to verification results of the temporary keys by the key verification unit being true, the drive planning unit generates a drive plan including a route to the target parking position based on the target position information, and transmits the drive plan to the server device. In response to a reception of the drive plan transmitted from the vehicle, the plan verification unit verifies whether the drive plan is available, and the plan verification unit transmits, to the vehicle, available information indicating that the drive plan is available when the drive plan is verified to be available. In response to a reception of the available information transmitted from the server device, the autonomous driving control unit executes the autonomous driving control of the vehicle according to the drive plan generated by the drive planning unit.

As described above, the above autonomous valet parking system is mainly constructed on the automobile, and the drive plan is generated by the drive planning unit of the automobile. The drive plan verification unit included in the server device verifies whether the drive plan is available or not. In the above configuration, the validity of the drive plan generated in the automobile is verified by the server device installed to the parking lot. Thus, a safety of the drive plan can be guaranteed. According to the above configuration, it is possible to obtain an excellent effect that a safety of the system constructed mainly on the automobile can be enhanced.

The following will describe detailed embodiments of the present disclosure with reference to the accompanying drawings. In each embodiment, the substantially same components are denoted by the same reference numerals and description thereof is omitted.

First Embodiment

The following will describe a first embodiment of the present disclosure with reference to FIG. 1 to FIG. 10.
(Overall Configuration of Autonomous Valet Parking System 100)

The autonomous valet parking system 100 of the present embodiment shown in FIG. 1 includes a terminal device 200, an automobile 300 corresponding to a vehicle, a parking lot server device 400, and a map server device 500. The autonomous valet parking system 100 executes a valet parking by autonomous driving control. In the following description, autonomous valet parking may be abbreviated as AVP. The terminal device 200 has a communication function, and stores authentication information of an owner of the terminal device 200. The terminal device 200 and the automobile 300 are configured to enable transmission and reception of data, that is, communication with one another.

As shown by a broken line in FIG. 1, the terminal device 200 and the automobile 300 may be configured to transmit and receive data by, for example, a short-range wireless communication. Alternatively, the terminal device 200 and the automobile 300 may be configured to transmit and receive data via a network 600. Examples of the network 600 include a wireless LAN, a mobile communication network or the like. The terminal device 200 and the parking lot server device 400 are communicably connected with one another via the network 600. The automobile 300 and the parking lot server device 400 are communicably connected with one another via the network 600. As described above, in the AVP system 100, the terminal device 200, the automobile 300, and the parking lot server device 400 are configured so that data can be transmitted and received to and from one another.

In the present embodiment, the terminal device 200 is provided by a smart device such as a smartphone or a tablet terminal. The terminal device 200 may be provided by an electronic key of an automobile. In this configuration, the authentication information of the owner is stored in the electronic key and a communication function is added to the electronic key. The automobile 300 has an autonomous driving function. The automobile 300 and the map server device 500 are communicably connected via the network.

The parking lot server device 400 is provided at a parking lot of a facility that provides a valet parking service. The parking lot server device 400 may be directly managed and controlled by such a facility, or may be managed by a parking lot management company contracted with the facility. The map server device 500 acquires valid range information which is information about a valid range of temporary key described later, and transmits the valid range information to the automobile 300. In the following description, the valid range is also referred to as a valid area, and the valid range information is also referred to as valid area information. The map server device 500 is managed and controlled by a reliable third party, for example, an administration related to autonomous driving control, a specialized public institution in charge of location survey, and related organizations of the government organization such as Ministry of Land, Infrastructure, Transport and Tourism.

(Detailed Configuration of Terminal Device 200)

An electronic key is stored in the terminal device 200, and the automobile 300 can be controlled to execute the autonomous driving by performing authentication to the electronic key transmitted from the terminal device 200. However, transmission of the electronic key to an external device or the like without any specific limitation may cause a decrease in security.

Thus, the terminal device 200 generates a temporary key Da that functions equivalent to the electronic key only when the AVP is executed. With this temporary key Da, it is possible to authenticate the owner in the same manner as the electronic key, and the automobile 300 can be controlled to execute the autonomous driving using the temporary key. However, the temporary key Da is designed to expire under conditions different from those of the electronic key. For example, when a predetermined valid period has passed, or when the automobile 300 travels out of the valid range, the temporary key becomes expired.

Figure 2:
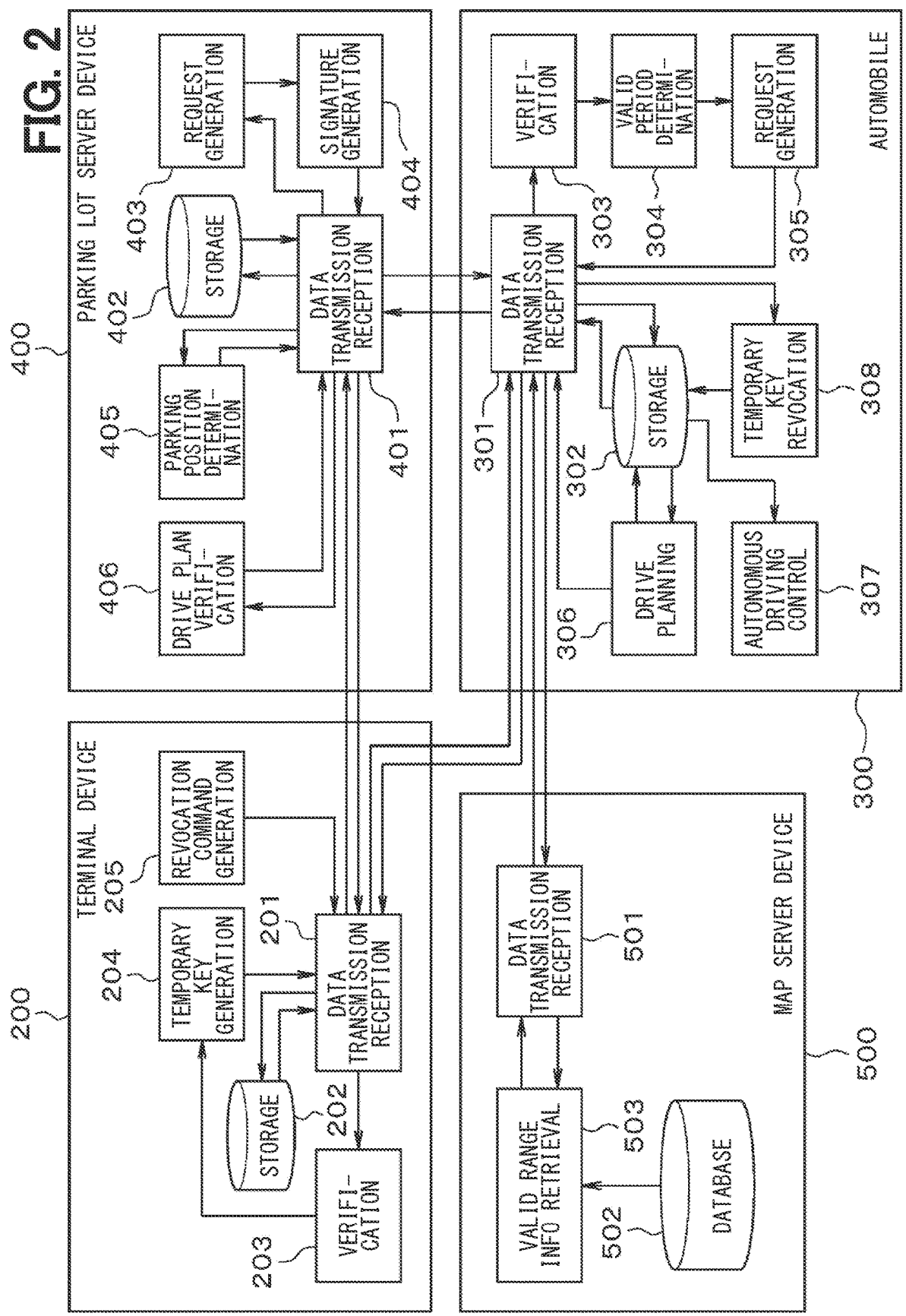
FIG. 2 is a diagram schematically illustrating a detailed configuration of each part of the autonomous valet parking system according to the first embodiment.

As shown in FIG. 2, the terminal device 200 includes a data transmission reception unit 201 for transmitting and receiving various data to and from an external device. The terminal device 200 includes a storage unit 202 for storing various data. The terminal device 200 includes, as functional blocks, a verification unit 203, a temporary key generation unit 204, and a revocation command generation unit 205. The function blocks are implemented in software manner that a CPU included in the terminal device 200 executes a computer program stored in a non-transitory tangible storage medium and performs a process corresponding to the computer program. Alternatively, at least a part of the functional blocks of the terminal device may be implemented in hardware manner. Alternatively, the computer program stored in the non-transitory tangible storage medium may be provided as a program product.

When the verification unit 203 receives a temporary key request Db transmitted from the parking lot server device 400 via the data transmission reception unit 201, the verification unit 203 verifies the temporary key request Db. The verification unit 203 corresponds to a key request verification unit. The process executed by the verification unit 203 corresponds to a key request verification procedure. The transmission of the temporary key request Db from the parking lot server device 400 will be described later. The temporary key generation unit 204 generates the temporary key Da when the verification result verified by the verification unit 203 is true.

Further, the temporary key generation unit 204 transmits the generated temporary key Da to the automobile 300 and to the parking lot server device 400 via the data transmission reception unit 201. The process executed by the temporary key generation unit 204 corresponds to a temporary key generation procedure. The revocation command generation unit 205 generates a revocation command Dc that forcibly revokes the temporary key Da based on a predetermined condition, for example, when the owner requests revocation. Further, the revocation command generation unit 205 transmits the generated revocation command Dc to the automobile 300 via the data transmission reception unit 201.

(Detailed Configuration of Automobile 300)

The automobile 300 includes a data transmission reception unit 301 for transmitting and receiving various data to and from an external device. The automobile 300 includes a storage unit 302 for storing various data. The automobile 300 includes, as functional blocks, a verification unit 303, a valid period determination unit 304, a request generation unit 305, a drive planning unit 306, an autonomous driving control unit 307, and a temporary key revocation unit 308. The function blocks are implemented in software manner that a CPU included in the automobile 300 executes a computer program stored in a non-transitory tangible storage medium and performs a process corresponding to the computer program. Alternatively, at least a part of the functional blocks of the automobile may be implemented in hardware manner.

In response to receiving the temporary keys Da transmitted from the terminal device 200 and the parking lot server device 400, the verification unit 303 verifies the temporary key Da. The verification unit 303 corresponds to a key verification unit. The process executed by the verification unit 303 corresponds to a key verification procedure. The transmission of the temporary key Da from the parking lot server device 400 will be described later. The temporary key Da may be verified in various methods. For example, a signature may be assigned to the temporary key Da, and the signature may be verified in an exemplary verification method.

The valid period determination unit 304 determines a valid period of the temporary key Da when the verification result verified by the verification unit 303 is true. The request generation unit 305 generates a range information request Dd that requests a transmission of valid range information, and the request generation unit 305 corresponds to a range request generation unit. The process executed by the request generation unit 305 corresponds to a range information request generation procedure. The range information request Dd also includes information on a current position of the automobile 300. The request generation unit 305 transmits the generated range information request Dd to the map server device 500 via the data transmission reception unit 301.

The drive planning unit 306 generates a driving plan De when the verification result verified by the verification unit 303 is true and the valid period of temporary key Da has not elapsed. When the drive planning unit 306 receives target position information Df transmitted from the parking lot server device 400 via the data transmission reception unit 301, the drive planning unit 306 generates a drive plan De based on the target position information Df. The process executed by the drive planning unit 306 corresponds to a drive planning procedure. The transmission of the target position information Df by the parking lot server device 400 will be described later. The drive plan De includes the current position of the automobile 300, a target parking position, a route from the current position to the target parking position, a period of travelling straight, a time to turn left or right, a time to reverse travelling of the automobile 300, and a traveling speed corresponding to each travailing scene.

When the drive planning unit 306 receives valid range information Dg transmitted from the map server device 500 via the data transmission reception unit 301, the drive planning unit 306 generates the drive plan De in consideration of the valid range information Dg. The transmission of valid range information Dg by the map server device 500 will be described later. The drive planning unit 306 transmits the generated drive plan De to the parking lot server device 400 via the data transmission reception unit 301.

When the drive planning unit 306 receives correction information Dh and the unavailable information Di transmitted from the parking lot server device 400 via the data transmission reception unit 301, the drive planning unit 306 regenerates the drive plan De based on the correction information Dh. The transmission of the correction information Dh and the unavailable information Di by the parking lot server device 400 will be described later. When the drive plan De is generated again, the drive planning unit 306 transmits the regenerated drive plan De to the parking lot server device 400 via the data transmission reception unit 301.

When the autonomous driving control unit 307 receives available information Dj transmitted from the parking lot server device 400 via the data transmission reception unit 301, the autonomous driving control unit 307 executes an autonomous driving control according to the drive plan De generated by the drive planning unit 306. The process executed by the autonomous driving control unit 307 corresponds to an autonomous driving control procedure. The transmission of the available information Dj by the parking lot server device 400 will be described later. When the temporary key revocation unit 308 receives the revocation command Dc transmitted from the terminal device 200 via the data transmission reception unit 301, the temporary key revocation unit 308 revokes the temporary key Da.

(Detailed Configuration of Parking Lot Server Device 400)

The parking lot server device 400 includes a data transmission reception unit 401 for transmitting and receiving various data to and from an external device. The parking lot server device 400 includes a storage unit 402 for storing various data. The parking lot server device 400 includes, as functional blocks, a request generation unit 403, a signature generation unit 404, a parking position determination unit 405, and a drive plan verification unit 406. The function blocks are implemented in software manner that a CPU included in the parking lot server device 400 executes a computer program stored in a non-transitory tangible storage medium and performs a process corresponding to the computer program. Alternatively, at least a part of the functional blocks of the parking lot server device may be implemented in hardware manner.

The request generation unit 403 generates the temporary key request Db that requests the generation of the temporary key Da, and transmits the temporary key request Db to the terminal device 200. The request generation unit 403 corresponds to a key request generation unit. The process executed by the request generation unit 403 corresponds to a key request generation procedure. The signature generation unit 404 assigns a signature to the temporary key request Db generated by the request generation unit 403. The reason for assigning the signature is to enable the terminal device 200 to determine an authenticity of the temporary key request Db. The temporary key request Db to which the signature is assigned is transmitted to the terminal device 200 via the data transmission reception unit 401.

In response to receiving the temporary key Da transmitted from the terminal device 200 via the data transmission reception unit 401, the parking position determination unit 405 determines the target parking position of the automobile 300. The parking position determination unit 405 transmits, to the automobile 300 via the data transmission reception unit 401, the target position information Df, which is information about a specified target parking position, together with the temporary key Da. The process executed by the parking position determination unit 405 corresponds to a parking position determination procedure. The target position information Df includes map information of the parking lot, the target parking position indicating, for example, a designated parking space.

When the drive plan verification unit 406 receives the drive plan De transmitted from the automobile 300 via the data transmission reception unit 401, the drive plan verification unit 406 verifies whether the drive plan De is available. The drive plan verification unit 406 corresponds to a plan verification unit. When the drive plan De is available, the drive plan verification unit 406 transmits the available information Dj indicating that the drive plan De is available to the automobile 300 via the data transmission reception unit 401.

When the drive plan De is not available, the drive plan verification unit 406 generates the correction information Dh, which requires a correction of the drive plan De. The drive plan verification unit 406 transmits the generated correction information Dh and the unavailable information Di indicating that the drive plan De is unavailable to the automobile 300 via the data transmission reception unit 401. The process executed by the drive plan verification unit 406 corresponds to a plan verification procedure.

(Detailed Configuration of Map Server Device 500)

The map server device 500 includes a data transmission reception unit 501 for transmitting and receiving various data to and from an external device. The map server device 500 includes a database 502 configured to store various data. The map server device 500 includes, as a functional block, a valid range information retrieval unit 503. The valid range information retrieval unit 503 is implemented in software manner that a CPU included in the map server device 500 executes a computer program stored in a non-transitory tangible storage medium and performs a process corresponding to the computer program. The valid range information retrieval unit 503 may be implemented in a hardware manner.

The valid range information retrieval unit 503 acquires the valid range information Dg, which is information about the valid range of the temporary key Da. The valid range information retrieval unit 503 corresponds to a valid range acquisition unit. The valid range corresponds to a travelable range or a travelable distance which the automobile 300 can travel using the temporary key Da. The valid range information corresponds to travelable range information which is the information about the travelable range. Specifically, in response to receiving the range information request Dd transmitted from the automobile 300 via the data transmission reception unit 501, the valid range information retrieval unit 503 searches various data stored in the database 502 to acquire the valid range information Dg. The valid range information retrieval unit 503 transmits the acquired valid range information Dg to the automobile 300 via the data transmission reception unit 501.

The valid range information Dg may be prepared in advance by, for example, a reliable third party, and is stored in the database 502. The valid range information Dg is map information, and stores information about the valid range within which the temporary key Da can be used in valid state. For example, only in an area where the AVP service can be provided, that is, an area within the parking lot may be set as the valid range.

(Specific Verification Method of Drive Plan)

The drive plan verification unit 406 of the parking lot server device 400 may adopt the following method as a specific verification method of the drive plan De. The drive plan verification unit 406 may determine that the drive plan De is available when a first condition that the automobile 300 is not guided to an outside of the parking lot is satisfied. When drive plan De satisfies the first condition, for example, the automobile 300 is not guided to the outside of the parking lot, it is possible to prevent an occurrence of the worst situation in which the automobile 300 is hacked and led to the outside of the parking lot and stolen by a malicious third party against an intention of the user.

The drive plan verification unit 406 may determine that the drive plan De is available when a second condition, which properly guides the automobile to a correct target position, is satisfied in addition to the first condition. Specifically, the second condition can be set to be satisfied when a difference between the target position of the automobile 300 in the drive plan De and the target parking position represented by the target position information Df is less than a predetermined threshold error. The predetermined threshold error may be set according to various performances of the parking lot server device 400. When the drive plan De satisfies the second condition, it is possible to prevent the parking lot server device 400 from adversely affecting the management of the parking space.

As a third condition, the drive plan verification unit 406 may determine whether a traveling direction of the automobile 300 in the drive plan De conforms to the designated traveling direction in the parking lot in addition to the first condition or in addition to the first condition and the second condition. The drive plan verification unit may determine that the drive plan De is available when the third condition is satisfied in addition to the first condition, or the third condition is satisfied in addition to the first and second conditions. In the parking lot, it is highly possible that multiple automobiles are travelling at the same time. In this situation, when the automobile 300 travels against the designated traveling direction in the parking lot, the automobile 300 will run reverse and may cause a trouble in travelling safety. When the drive plan De satisfies the above-mentioned third condition, it is possible to suppress the deterioration of safety caused by the reverse travelling.

In the third condition, the determination that the actual traveling direction conforms to the designated traveling direction may be made when general travelling directions match with one another. Alternatively, the determination that the actual traveling direction conforms to the designated traveling direction may be made when detailed travelling direction, that is, the traveling route of the automobile 300 of the drive plan conforms exactly to the designated travelling direction in the parking lot. The drive plan verification unit 406 may determine that the drive plan De is available when the planed traveling route of the automobile 300 according to the drive plan De does not collide with a pillar in the parking lot or another parked automobile. Such a determination may be appropriately performed according to various performances of the parking lot server device 400.

(Specific Method of Generating Correction Information)

The drive plan verification unit 406 of the parking lot server device 400 may adopt any one of the following two methods as a specific method of generating the correction information Dh. As a first method of generating the correction information, the drive plan verification unit may instruct, as the correction information Dh, a specific content of a part of the drive plan De to be corrected.

In the first method, as the correction information Dh, information in which a part of the drive plan De to be corrected is correlated to a solution to the specific part may be generated. According to such first method of generating the correction information, the automobile 300 can regenerate the drive plan De after specifying the part in trouble and the method for solving the trouble. Therefore, according to the first method of generating the correction information, it is possible to regenerate the drive plan De that is available with a small number of corrections, and it is possible to reduce the processing load of the automobile 300.

As a second method of generating the correction information, the drive plan verification unit may instruct, as the correction information Dh, regeneration of the drive plan De since the current drive plan De is not available. According to such a second method of generating the correction information, the parking lot server device 400 does not need to specify a method for solving the trouble, and the processing load of the parking lot server device can be reduced. Although the correction depends on the method of generating the drive plan De, that is, the algorithm, when generating the drive plan De heading to the same target position, a different route may be generated in a different try without always generating the same route every time.

When the drive plan is simply reset and started from the beginning, the trouble may be solved. When the trouble is caused by a bug of a program, it is possible to solve the bug by regenerating the drive plan, and an available drive plan De with no trouble can be provided. Therefore, when the drive plan De is regenerated based on the correction information Dh generated by the second method, an available drive plan without trouble can be eventually generated.

The following will describe an operation of the above configuration. The following will describe process executed by each part of the AVP system with reference to FIG. 3 and FIG. 4.

(Process from AVP Request to Temporary Key Verification)

Figure 3:
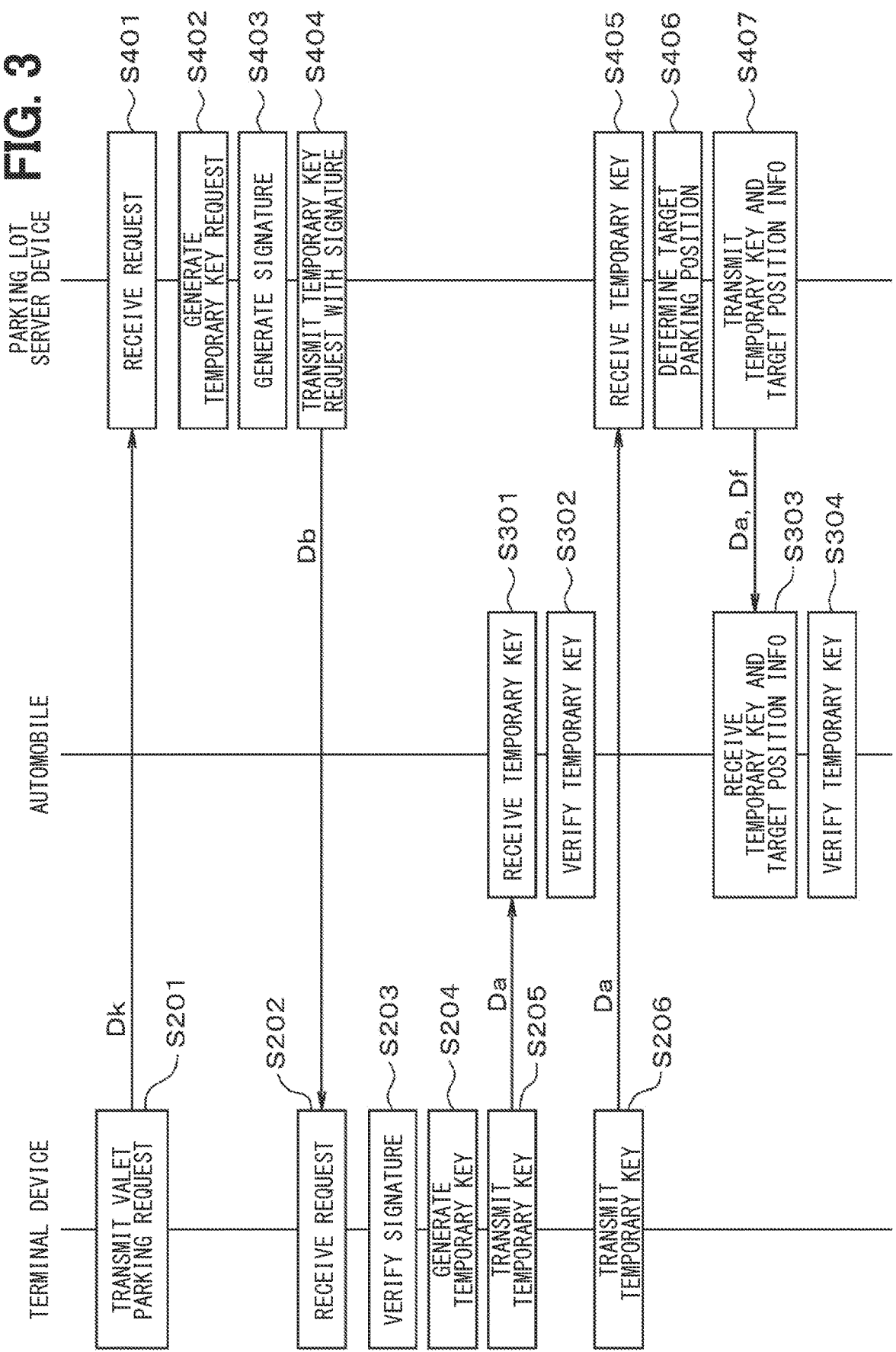
FIG. 3 is a diagraming partially showing a process executed by each part in the autonomous valet parking according to the first embodiment.

The following will describe a process from AVP request to temporary key verification with reference to FIG. 3. When the valet parking is requested by the user's operation, the terminal device 200 transmits request information Dk indicating that the valet parking is requested by the user to the parking lot server device 400 in S201.

The request information Dk includes information to be used in selection of a parking space, such as a type of the automobile 300 to be valet parked (for example, whether it is a normal size vehicle or a small size vehicle), a vehicle height, and the like. When the parking lot server device 400 receives the request information Dk in S401, the parking lot server device 400 generates the temporary key request Db in S402 and assigns a signature to the temporary key request Db in S403. Then, the parking lot server device 400 transmits the temporary key request Db with signature to the terminal device 200 in S404.

When the terminal device 200 receives the temporary key request Db in S202, the terminal device 200 verifies, in S203, the temporary key request Db based on the signature assigned to the temporary key request Db. When the verification result in S203 is true, the terminal device 200 generates the temporary key Da in S204. Then, the terminal device 200 transmits the temporary key Da to the automobile 300 in S205, and also transmits the temporary key Da to the parking lot server device 400 in S206.

When the automobile 300 receives the temporary key Da in S301, the automobile 300 verifies the temporary key Da in S302. In response to receiving the temporary key Da in S405, the parking lot server device 400 determines the target parking position of the automobile 300 in S406. At this time, the parking lot server device 400 selects an appropriate target parking position according to the availability of the parking space in the parking lot.

When the request information Dk includes information such as the type of the automobile 300 and the vehicle height, the parking lot server device 400 may select an optimum target parking position in consideration of those information included in the request information. Then, the parking lot server device 400 transmits, in S407 to the automobile 300, the temporary key Da and the target position information Df, which indicates the specified target parking position. When the automobile 300 receives the temporary key Da and the target position information Df in S303, the automobile 300 verifies the temporary key Da in S304.

(Process from Valid Range Request to Autonomous Driving Start)

Figure 4:
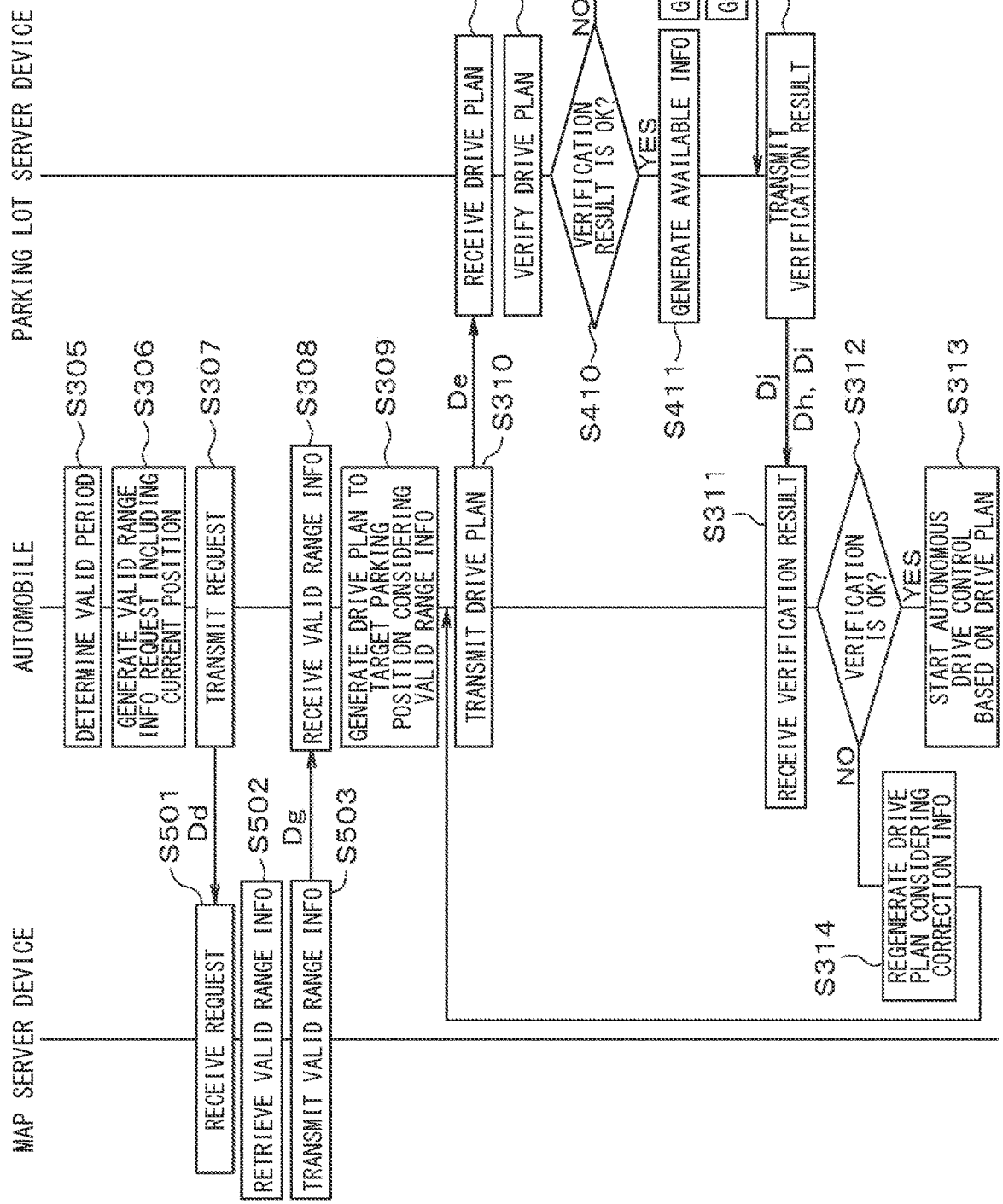
FIG. 4 is a diagraming partially showing a process executed by each part in the autonomous valet parking according to the first embodiment.

The following will describe a process from valid range request to autonomous driving start with reference to FIG. 4. When the automobile 300 determines the valid period of the temporary key Da in S305 when the verification results in S302 and S304 are true. In S305, when the automobile 300 determines that the valid period of the temporary key Da has not expired, the automobile generates the range information request Dd in S306. Then, the automobile 300 transmits the range information request Dd to the map server device 500 in S307.

When the map server device 500 receives the range information request Dd in S501, the map server device 500 acquires the valid range information Dg by searching various data stored in the database 502 in S502. Then, the map server device 500 transmits the valid range information Dg to the automobile 300 in S503. When the automobile 300 acquires the valid range information Dg in S308, the automobile 300 generates the plan De based on the target position information Df and the valid range information Dg in S309.

In S309, the automobile 300 generates the drive plan De from the current position to the target parking position indicated by the target position information Df with consideration of the valid range of the temporary key Da indicated by the valid range information Dg. Then, the automobile 300 transmits the drive plan De to the parking lot server device 400 in S310. In response to receiving the drive plan De in S408, the parking lot server device 400 verifies whether the drive plan De is available in S409.

When the parking lot server device 400 determines that the drive plan De is available as a result of the verification in S409, that is, when the verification result is available and the parking lot server device determines YES in S410, the process proceeds to S411 and generates the available information Dj in S411. After executing S411, the process proceeds to S412. In S412, the parking lot server device 400 transmits the verification result of the drive plan De to the automobile 300. In this case, the parking lot server device 400 transmits the available information Dj as the verification result.

When the parking lot server device 400 determines that the drive plan De is not available as a result of the verification in S409, that is, when the verification result is unavailable and the parking lot server device determines NO in S410, the process proceeds to S413 and generates the unavailable information Di in S413. Then, the parking lot server device 400 generates the correction information Dh which is the information requiring the correction of the drive plan De in S414. After executing S414, the process proceeds to S412. In this case, the parking lot server device 400 transmits the unavailable information Di and the correction information Dh to the automobile 300 as the verification result.

When the automobile 300 receives the verification result of the drive plan De in S311, the automobile 300 confirms the verification result. When the received verification result is the available information Dj, that is, when the verification result is available and determination in S312 is YES, the automobile 300 proceeds to S313 and starts autonomous driving control according to the drive plan De. When the received verification result is the unavailable information Di and the correction information Dh, that is, when the verification result is unavailable and determination in S312 is NO, the automobile 300 proceeds to S314 and regenerates the drive plan De based on the correction information Dh. After S314, the process returns to S310, and the automobile 300 transmits the regenerated drive plan De to the parking lot server device 400 again.

(Specific Examples of Drive Plan)

The following will describe specific examples of the drive plan De with reference to FIG. 5 to FIG. 10. In the following description, entrance of the automobile into the parking lot is described. In a case of exiting from the parking lot, similar configuration may be applied. In FIG. 5 to FIG. 10, multiple parking spaces separated by solid straight lines are schematically illustrated. A parking space indicating the target parking position is represented by a reference symbol G and hatching is applied to the target parking position.

In FIG. 5 to FIG. 10, among the route of the automobile 300 represented by the drive plan, a route of moving forward is represented by a solid arrow, and a route of moving backward is represented by a dashed arrow. Further, in FIG. 5 to FIG. 10, the designated traveling direction in the parking lot is represented by an outlined arrow. Although multiple automobiles are drawn in FIGS. 5 to 10, the reference numeral 300 is assigned only to the automobiles subject to the AVP among the multiple automobiles.

(1) Available Example of Drive Plan

Figure 5:
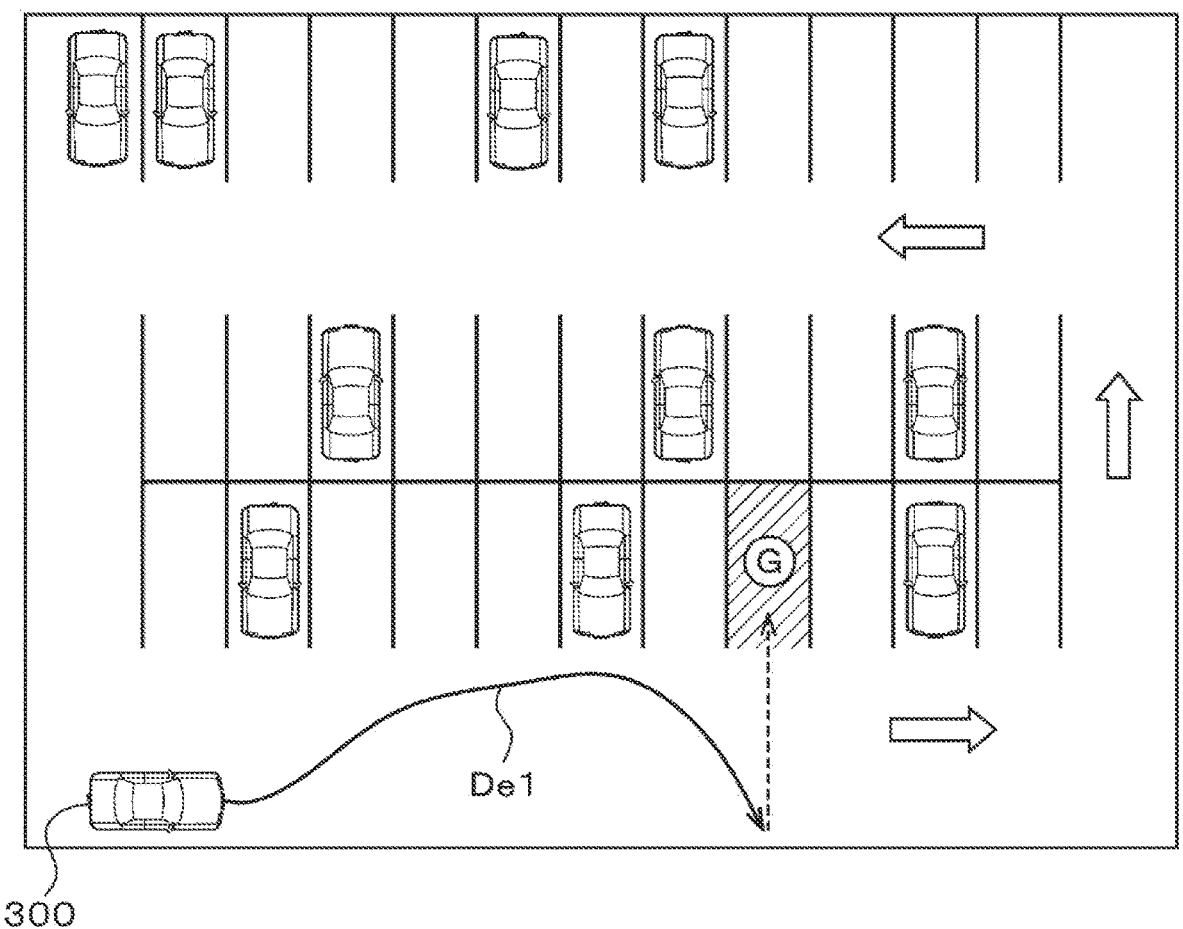
FIG. 5 is a diagram showing a specific example in which a driving plan according to the first embodiment is available.

As shown in FIG. 5, the drive plan De1 is a plan in which the automobile 300 does not go out of the parking lot, and satisfies the first condition. The drive plan De1 is a plan toward the correct target position G, and satisfies the second condition. The drive plan De1 is a plan conforming to the designated traveling direction in the parking lot, and satisfies the third condition. Therefore, the drive plan De1 is available and is a determined to be a proper plan. When the drive plan De1 is verified by the drive plan verification unit 406, the verification result is available.

(2) First Unavailable Example of Drive Plan

Figure 6:
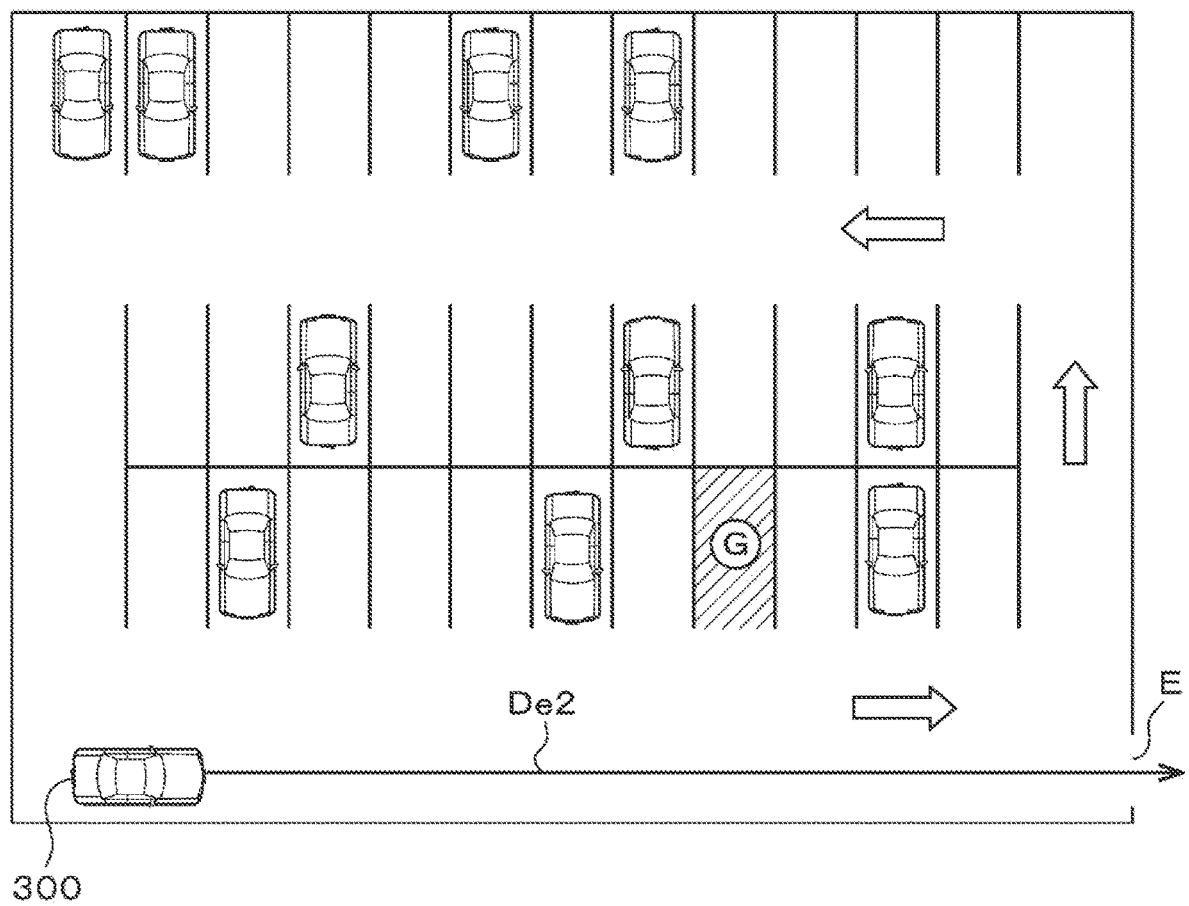
FIG. 6 is a diagram showing a first specific example in which a driving plan according to the first embodiment is unavailable.

As shown in FIG. 6, the drive plan De2 is a plan which leads the automobile 300 to the exit E of the parking lot, and does not satisfy the first condition. Therefore, the drive plan De2 is not available and is a determined to be an improper plan. When the drive plan De2 is verified by the drive plan verification unit 406, the verification result is unavailable. In such a first unavailable example, the position information used for generating the drive plan De2 in the automobile 300 is incorrect due to a certain abnormality. This unavailable example may occur in a case where the vehicle is intentionally hacked by a malicious third party and the drive plan is intentionally generated or changed by the malicious third party in order to guide the automobile 300 out of the parking lot.

(3) Second Unavailable Example of Drive Plan

Figure 7:
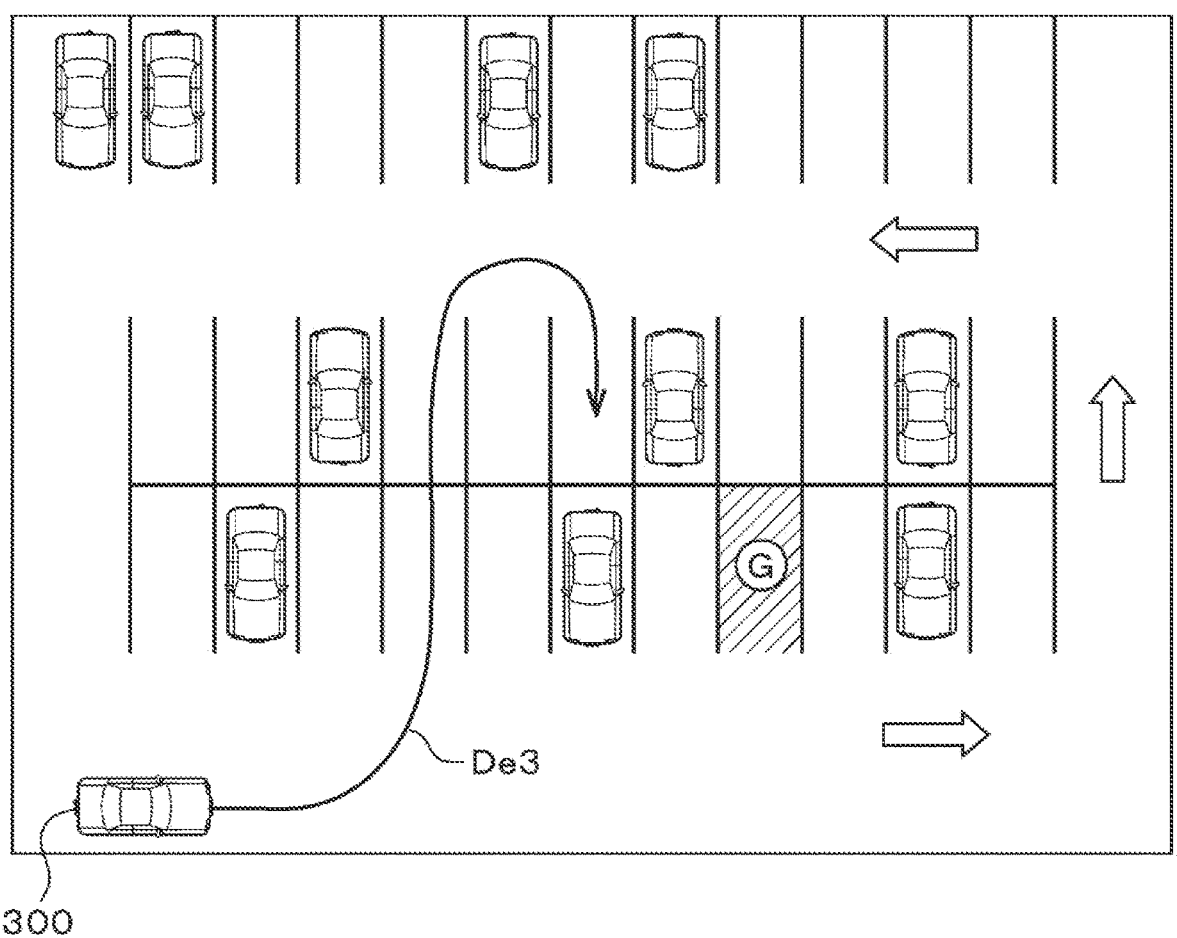
FIG. 7 is a diagram showing a second specific example in which a driving plan according to the first embodiment is unavailable.

As shown in FIG. 7, the drive plan De3 is a plan in which the automobile 300 does not go out of the parking lot, and satisfies the first condition. However, the drive plan De3 is a plan in which a parking space different from the correct target position G is set as the target position. The drive plan De3 is not a plan toward the correct target position G, and does not satisfy the second condition. The route of the automobile 300 in the drive plan De3 passes through not only the passage but also other parking spaces. Thus, the drive plan De3 is not a plan according to the designated traveling direction in the parking lot, and does not satisfy the third condition.

Therefore, the drive plan De3 is not available and is a determined to be an improper plan. When the drive plan De3 is verified by the drive plan verification unit 406, the verification result is unavailable. According to such unavailable example, although the automobile 300 can be parked in the parking space, the parked space is different from the designated parking space. This may cause the following risk.

There is a possibility that the space where the automobile 300 is actually parked based on the drive plan De3 does not fit the actual size of the automobile 300. For example, a normal size vehicle may be parked in a parking space dedicated to a small size vehicle. There is also a possibility that the parking space in which the automobile 300 is actually parked based on the drive plan De3 has been already reserved by another automobile for parking. When such a situation occurs, the parking lot server device 400 needs to correct the management status of the parking lot, for example, changing the reservation contents of the parking lot, and the processing load of the parking lot server device 400 may increase. Based on these reasons, the drive plan De3 of the second unavailable example should be verified to be unavailable.

(4) Another Second Unavailable Example of Drive Plan

Figure 8:
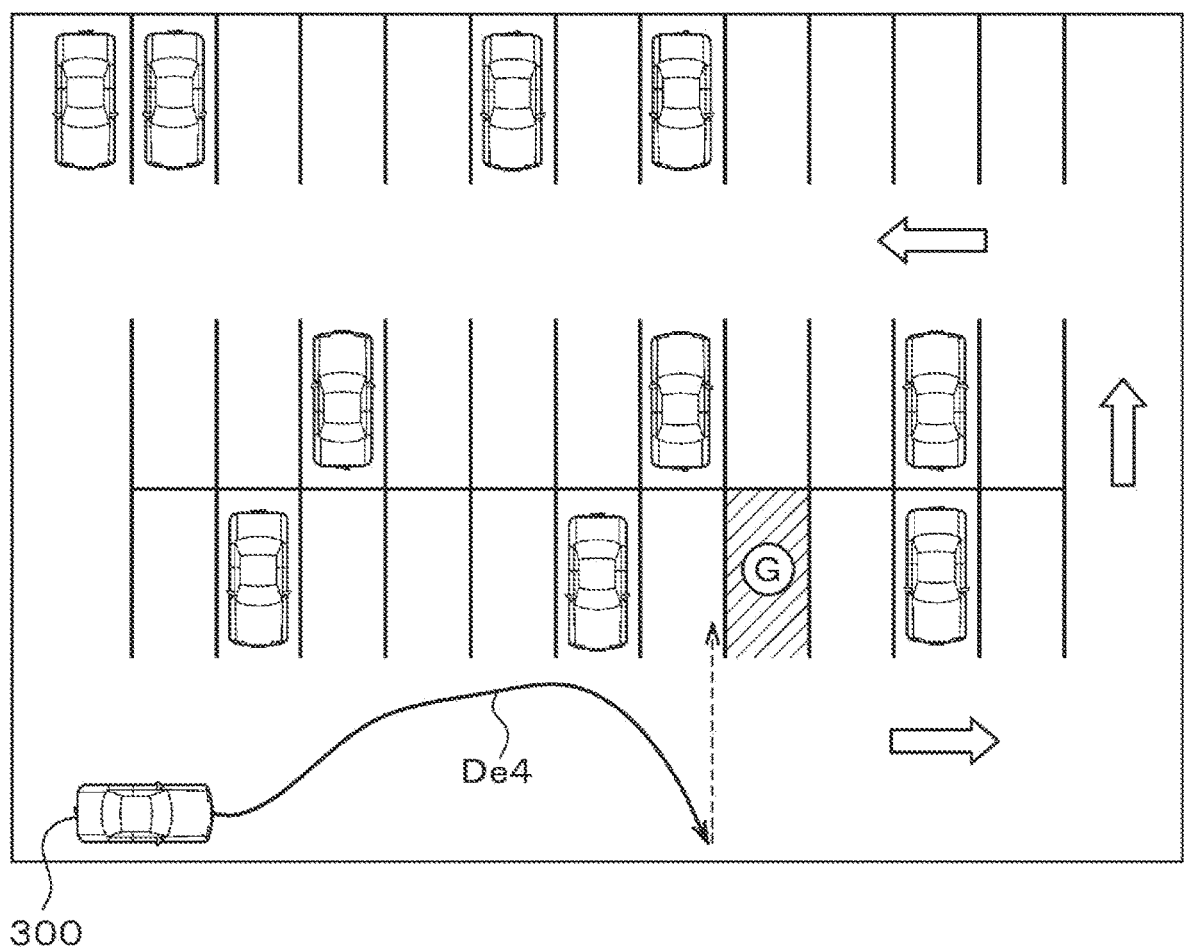
FIG. 8 is a diagram showing another second specific example in which a driving plan according to the first embodiment is unavailable.

As shown in FIG. 8, the drive plan De4 is a plan in which the automobile 300 does not go out of the parking lot, and satisfies the first condition. However, the target position in the drive plan De4 is a position slightly deviated from the correct target position G. The drive plan De4 is not a plan toward the correct target position G, and does not satisfy the second condition. Therefore, the drive plan De4 is not available and is a determined to be an improper plan. When the drive plan De4 is verified by the drive plan verification unit 406, the verification result is unavailable.

In the another second unavailable example of drive plan, under a condition that the parking lot server device 400 is a high-performance server, the deviation between the correct target position G, which is the designated parking space, and the target position in the drive plan De4 can be precisely determined, for example, in units of 10 cm. In this case, the parking lot server device 400 is able to transmit information for correcting the deviation to the automobile 300 as the correction information Dh. With this configuration, it is possible to easily regenerate another drive plan that eliminates the above-described deviation in the automobile 300.

When the performance of the parking lot server device 400 is low and the above deviation cannot be verified precisely by the parking lot server device 400, the verification result of the drive plan De4 by the drive plan verification unit 406 becomes available. Then, based on the drive plan De4, the automobile 300 may be parked at a position which is slightly displaced from the designated parking space. In this case, the parking space adjacent to the position where the automobile 300 is actually parked becomes narrow. When another automobile that tries to park in the adjacent space which becomes narrow can detect that the parking space is too narrow to be parked by using a sensor such as a camera, another automobile may request the parking lot server device 400 to provide another parking space where the parking is available. Thus, when the verification result of the drive plan De4 is determined to be available, there is no major problem.

(5) Third Unavailable Example of Drive Plan

Figure 9:
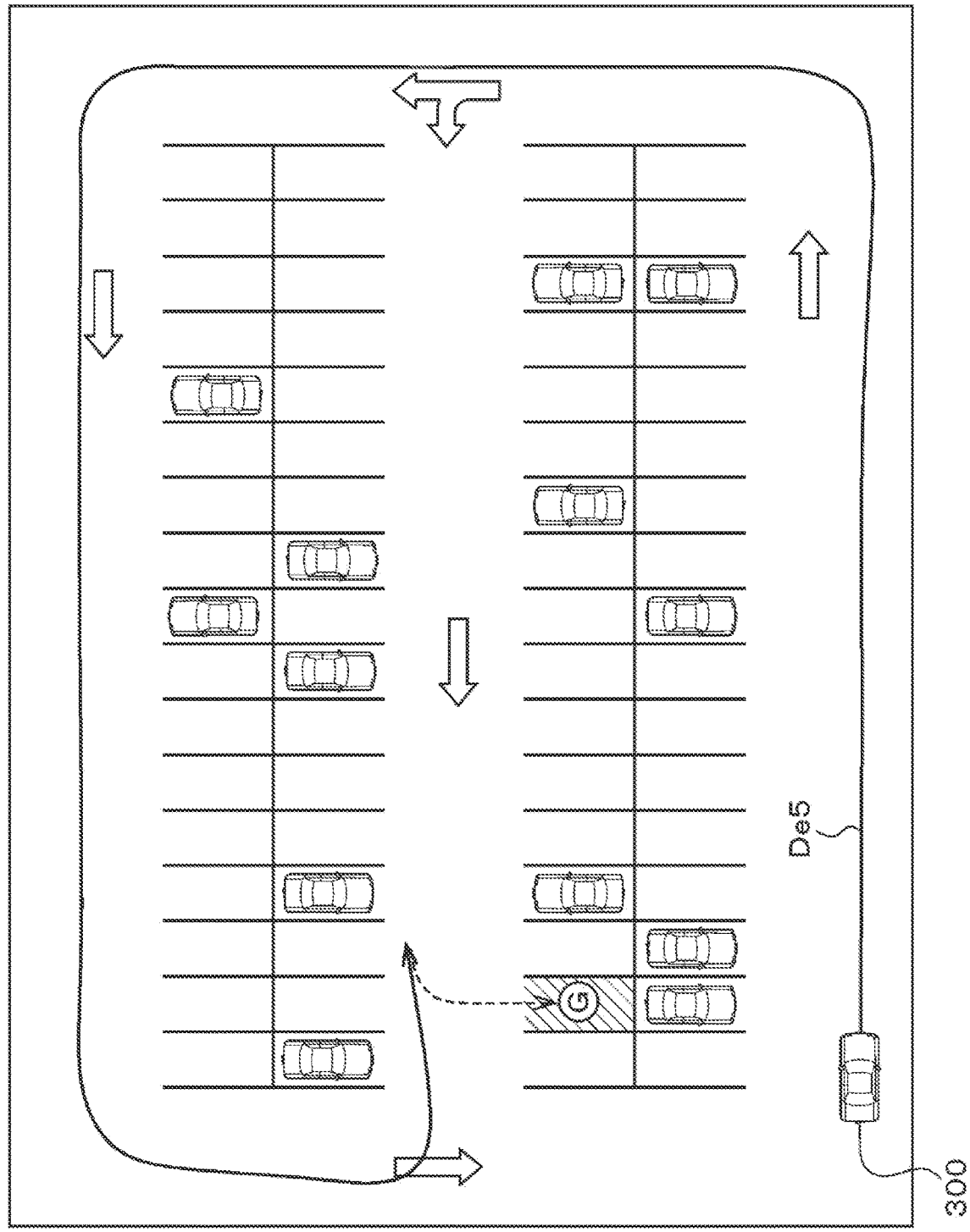
FIG. 9 is a diagram showing a third specific example in which a driving plan according to the first embodiment is unavailable.

As shown in FIG. 9, the drive plan De5 is a plan in which the automobile 300 does not go out of the parking lot, and satisfies the first condition. The drive plan De5 is a plan toward the correct target position G, and satisfies the second condition. However, the travelling route of the automobile 300 in the drive plan De5 is a route that guides a left turn on a passage where left turn is prohibited. Thus, the drive plan De5 is not a plan that conforms to the designated traveling direction in the parking lot, and does not satisfy the third condition. Therefore, the drive plan De5 is not available and is a determined to be an improper plan. When the drive plan De5 is verified by the drive plan verification unit 406, the verification result is unavailable.

(6) Another Third Unavailable Example of Drive Plan

Figure 10:
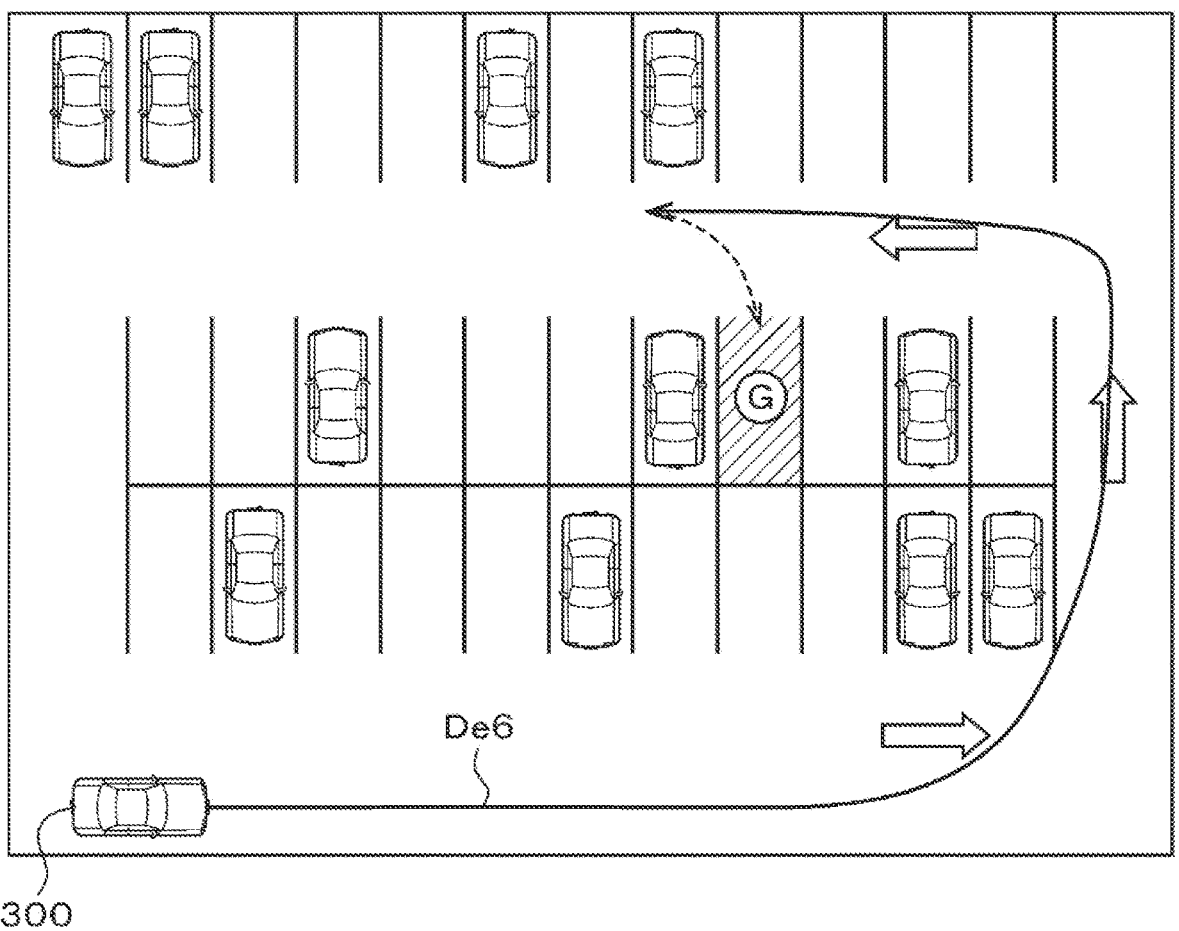
FIG. 10 is a diagram showing another third specific example in which a driving plan according to the first embodiment is unavailable.

As shown in FIG. 10, the drive plan De6 is a plan in which the automobile 300 does not go out of the parking lot, and satisfies the first condition. The drive plan De6 is a plan toward the correct target position G, and satisfies the second condition. However, the travelling route of the automobile 300 in the drive plan De6 guides the automobile 300 to pass a very close position from the parking space and the automobile 300 may come into contact with another vehicle parked in the parking space. Thus, the drive plan De6 is not a plan that conforms to the designated traveling direction in the parking lot, and does not satisfy the third condition. Therefore, the drive plan De6 is not available and is a determined to be an improper plan. When the drive plan De6 is verified by the drive plan verification unit 406, the verification result is unavailable.

In the another third unavailable example of drive plan, under a condition that the parking lot server device 400 is a high-performance server, the parking lot server device 400 can precisely determine a possible collision between the own automobile 300 that travels along the route specified based on the drive plan De6 and another parked automobile or a pillar in the parking lot. In this case, the parking lot server device 400 may transmit, as the correction information Dh, information indicating a travelling route that can sufficiently avoid such possible collision with another vehicle or other obstacles to the automobile 300. With this configuration, the automobile 300 is possible to easily regenerate another drive plan that can avoid any possible contact with another automobile or an obstacle such as a pillar.

When the performance of the parking lot server device 400 is low and the above collision with another parked automobile or a pillar cannot be determined precisely by the parking lot server device 400, the verification result of the drive plan De6 by the drive plan verification unit 406 becomes available. Then, based on the drive plan De6, the automobile 300 is controlled to perform the autonomous driving. In this case, the automobile 300 is autonomously driven so as to avoid a collision with another object by using a sensor such as a camera or a radar originally mounted to the automobile 300, and collision with another object can be avoided. Thus, when the verification result of the drive plan De6 is determined to be available, there is no major problem.

As described above, the AVP system 100 of the present embodiment is a system constructed mainly on the automobile 300, and the drive plan De is generated by the drive planning unit 306 included in the automobile 300. The drive plan verification unit 406 included in the parking lot server device 400 verifies whether the drive plan De is available or not. That is, in the above configuration, the validity of the drive plan De generated on the automobile 300 side is verified by the parking lot server device 400, whereby the safety of the drive plan De is guaranteed. Therefore, according to the present embodiment, it is possible to obtain an excellent effect that the safety of the system constructed mainly on the automobile 300 can be enhanced.

As a result of verifying the drive plan De, that is, when the drive plan De is not available due to a certain problem, the drive plan verification unit 406 of the parking lot server device 400 generates correction information Dh that indicates the correction of the drive plan De. Then, the drive plan verification unit 406 transmits the unavailable information Di indicating that the drive plan De is unavailable together with the correction information Dh to the automobile 300. When the drive planning unit 306 of the automobile 300 receives the correction information Dh and the unavailable information Di transmitted from the parking lot server device 400, the drive planning unit 306 regenerates the drive plan De based on the correction information Dh and transmits the regenerated drive plan De to the parking lot server device 400.

The drive plan De generated by the automobile 300 may not always precisely match the actual situation of the parking lot since the situation of the parking lot may change from moment to moment. In some cases, the drive plan De may be not appropriate to the situation of the parking lot. The parking lot server device 400 is highly likely to obtain the actual situation of the parking lot. Therefore, as described above, the parking lot server device 400 can transmit the correction information Dh having appropriate contents to the automobile 300, and as a result, the automobile 300 can easily regenerate an appropriate drive plan De based on the correction information Dh. When the automobile 300 receives the unavailable information Di from the parking lot server device 400, an autonomous driving control based on an improper drive plan De generated at that time is forbidden. This configuration can secure safety of the system.

The AVP system 100 of the present embodiment includes the map server device 500, and the map server device 500 includes the valid range information retrieval unit 503 that acquires valid range information Dg indicating information about the valid range of the temporary key Da. When the valid range information retrieval unit 503 receives the range information request Dd transmitted from the request generation unit 305 of the automobile 300, the valid range information retrieval unit 503 acquires the valid range information Dg and transmits the acquired valid range information Dg to the automobile 300. When the drive planning unit 306 of the automobile 300 receives the valid range information Dg, the drive planning unit 306 generates the drive plan De in consideration of the valid range information Dg. With this configuration, for the drive plan De generated by the automobile 300, it is possible to reduce occurrence of a problem, for example, a generation of drive plan including a route out of the parking lot.

Second Embodiment

Figure 11:
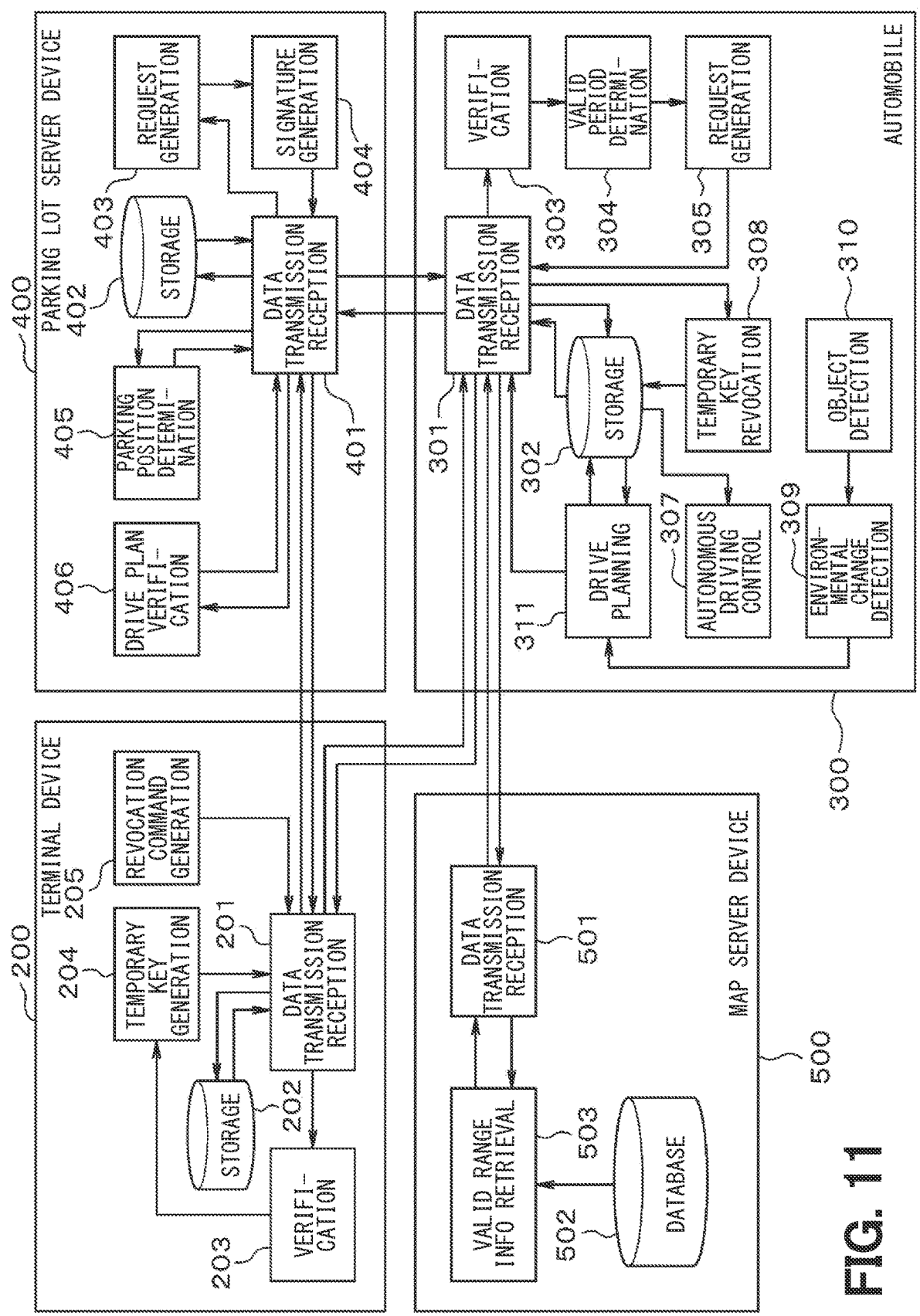
FIG. 11 is a diagram schematically illustrating a detailed configuration of each part of the autonomous valet parking system according to a second embodiment of the present disclosure.
Figure 12:
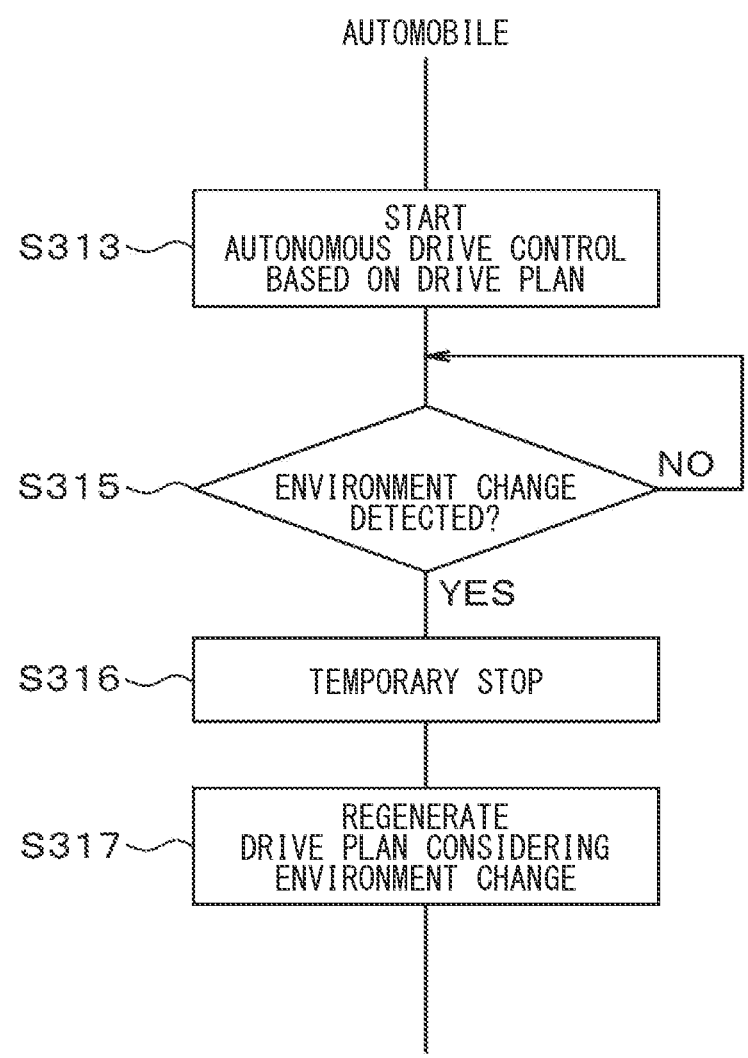
FIG. 12 is a diagraming showing a process executed by each part in the autonomous valet parking according to the second embodiment.

The following will describe a second embodiment of the present disclosure with reference to FIG. 11 and FIG. 12.

As illustrated in FIG. 11, compared with the automobile 300 of the first embodiment which is shown in FIG. 2, the automobile 300 of the present embodiment further includes an environmental change detection unit 309 and an object detection unit 310, and includes a drive planning unit 311 instead of the drive planning unit 306 of the first embodiment.

The environmental change detection unit 309 detects changes in an environment around the automobile 300. The object detection unit 310 detects an object existing around the automobile 300 based on detection signals transmitted from various sensors, which are mounted on the automobile 300 to execute autonomous driving control. For example, the sensors include a camera, a radar, or the like. When the environmental change detection unit 309 detects, using the object detection unit 310, an object (for example, a pedestrian, an obstacle, a falling object, etc.) that may hinder the traveling of the automobile 300 and the object is not included in the map information of the parking lot, the environmental change detection unit 309 determines that the environment around the automobile is changed. The process executed by the environmental change detection unit 309 corresponds to an environmental change detection procedure.

The drive planning unit 311 according to the present embodiment has the following functions in addition to the functions of the drive planning unit 306 described in the first embodiment. When the environmental change detection unit 309 detects a change in the environment, the drive planning unit 311 determines whether it is necessary to update the drive plan De based on the content of the detected environmental change. When the drive planning unit 311 determines that the update is necessary, the drive plan De is generated again, and the regenerated drive plan De is transmitted to the parking lot server device 400. For example, when an object such as an obstacle is detected in a planned route of the automobile 300 according to the current drive plan De, the drive planning unit 311 regenerates the drive plan De so that the drive plan De is changed to avoid the object.

The following will describe an operation of the above configuration.

As shown in FIG. 12, the automobile 300 of the present embodiment starts autonomous driving control according to the drive plan De in S313, and then proceeds to S315. In S315, the automobile 300 determines whether a change in the surrounding environment is detected. When a change in the environment is detected, the process determines "YES" in S315, and the process proceeds to S316. The automobile 300 activates a temporary stop in S316.

The temporary stop of the automobile 300 can be activated by the autonomous driving control unit 307. In S317, the automobile 300 determines whether it is necessary to update the drive plan De based on the content of the detected change in the environment. When the automobile 300 determines that the update is necessary, the drive plan De is regenerated with consideration of the environmental change information indicating the content of the environmental change. After S317, the process returns to S310, and the automobile 300 transmits the regenerated drive plan De to the parking lot server device 400.

As described above, the automobile 300 of the present embodiment includes the environmental change detection unit 309 that detects changes in the environment around the automobile 300. The automobile 300 of the present embodiment includes the object detection unit 310 that detects an object existing around the automobile 300. In the present embodiment, when the environmental change detection unit 309 detects a change in the environment, the drive planning unit 311 regenerates the drive plan De based on the content of the detected change in the environment, and the regenerated drive plan De is transmitted to the parking lot server device 400.

According to the above configuration, after the autonomous driving control is started based on the generated driving plan De, when an object that hinders the travelling of the automobile 300 is detected, that is, the environment in the parking lot is changed, the drive plan De is regenerated corresponding to the environment change and the autonomous driving control corresponding to the environment change in the parking lot can be continuously carried out. In this configuration, the automobile 300 is controlled to maintain a temporary stop state until the drive plan De is regenerated and the regenerated drive plan De is determined by the drive plan verification unit 406 of the parking lot server device 400 to be appropriate. Thus, travelling control safety can be secured.

Third Embodiment

Figure 13:
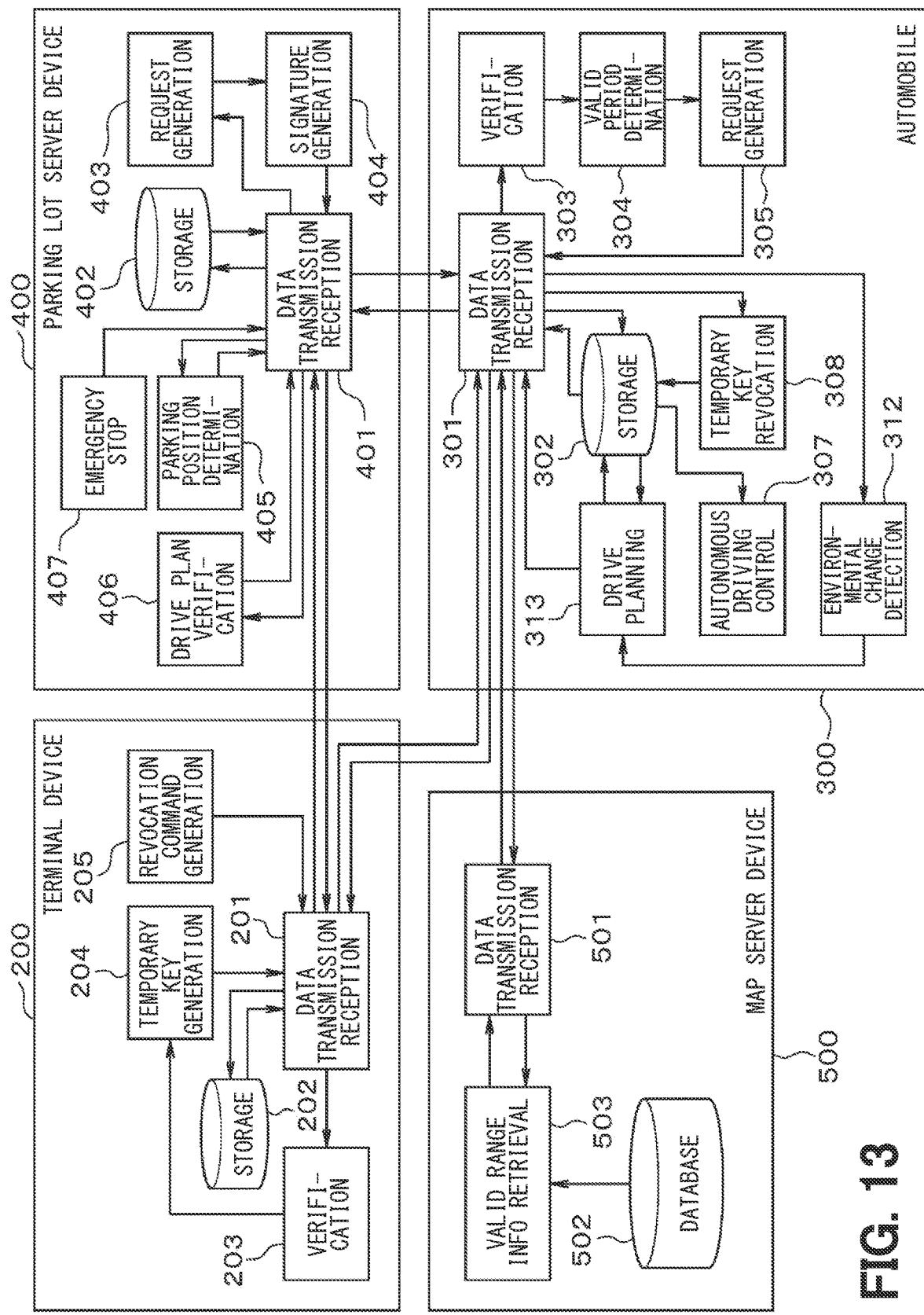
FIG. 13 is a diagram schematically illustrating a detailed configuration of each part of the autonomous valet parking system according to a third embodiment of the present disclosure.
Figure 14:
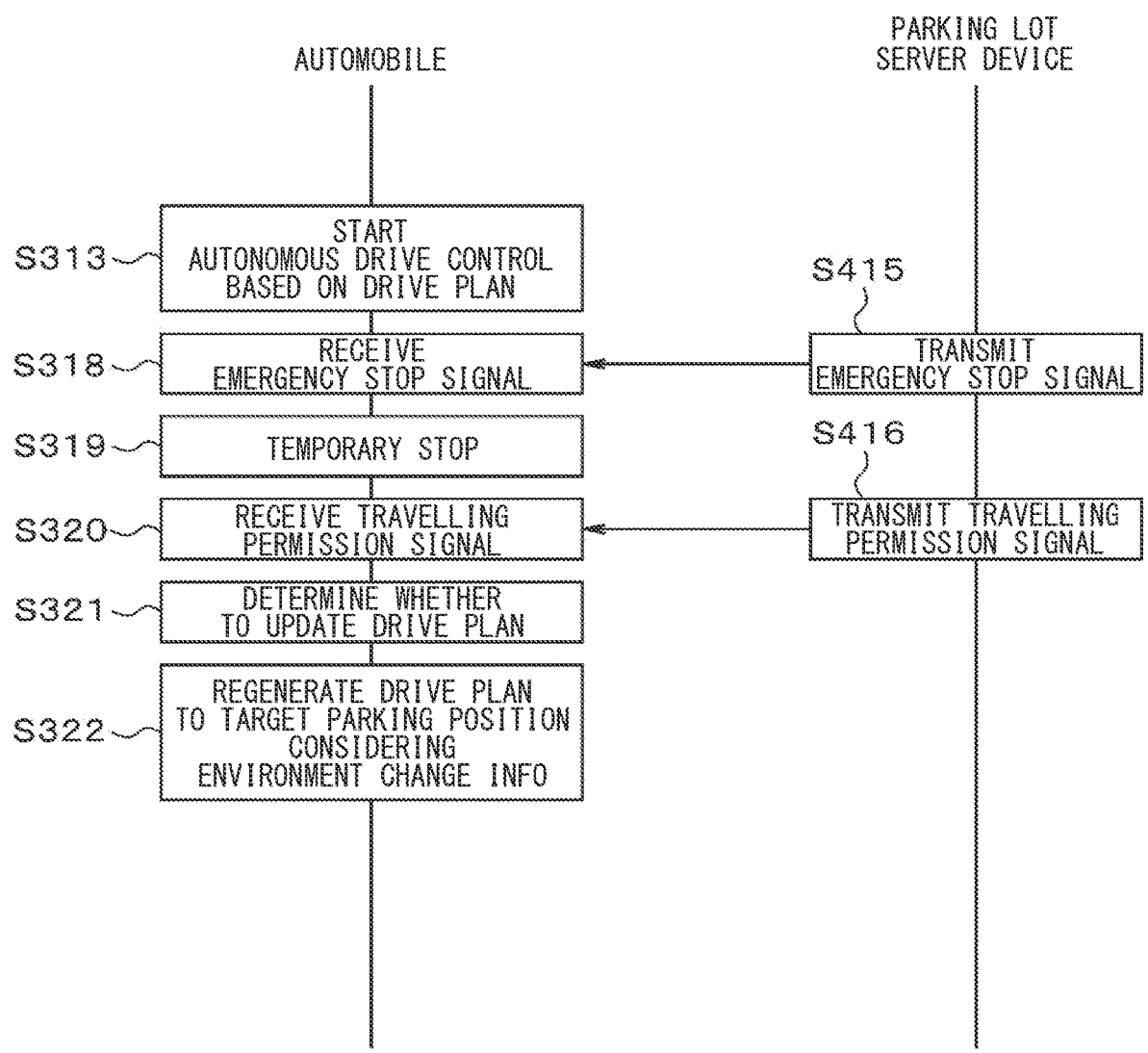
FIG. 14 is a diagraming showing a process executed by each part in the autonomous valet parking according to the third embodiment.

The following will describe a third embodiment of the present disclosure with reference to FIG. 13 and FIG. 14.

As shown in FIG. 13, the parking lot server device 400 of the present embodiment further includes an emergency stop unit 407 compared with the parking lot server device 400 of the first embodiment shown in FIG. 2. The automobile 300 of the present embodiment further includes an environmental change detection unit 312 compared with the automobile 300 of the first embodiment shown in FIG. 2, and includes a drive planning unit 313 instead of the drive planning unit 306 of the first embodiment.

The emergency stop unit 407 transmits an emergency stop signal that instructs an emergency stop to all of the automobiles including the subject automobile 300 travelling in the parking lot via the data transmission reception unit 401. The emergency stop signal may be triggered by an event in which the automobile cannot normally execute the AVP. For example, the event may include an occurrence of a disaster, detection of pedestrian entry into an area where pedestrians are prohibited from entering, stop of power supply to the parking lot server device 400 or the like.

After the emergency stop signal is transmitted, the emergency stop unit 407 transmits a travelling permission signal for canceling the emergency stop of the automobiles via the data transmission reception unit 401 when the event has triggered the emergency stop is recovered. The travelling permission signal also includes information about change in the parking lot inside environment before and after the emergency stop. The process executed by the emergency stop unit 407 corresponds to an emergency stop procedure. As described above, in the present embodiment, the transmission of the emergency stop signal and the travelling permission signal is automatically determined by the system of the parking lot. Alternatively, the transmission of the emergency stop signal and the travelling permission signal may be determined and executed by a person who is in charge of the parking lot.

The environmental change detection unit 312 detects change in the environment around the automobile 300, similarly to the environmental change detection unit 309 of the second embodiment. In the present embodiment, when the environmental change detection unit 312 receives the emergency stop signal transmitted from the parking lot server device 400 via the data transmission reception unit 301, the environmental change detection unit 312 determines occurrence of environment change. The process executed by the environmental change detection unit 312 corresponds to an environmental change detection procedure. Similar to the drive planning unit 311 in the second embodiment, when the environmental change detection unit 312 detects a change in the environment, the drive planning unit 313 in the present embodiment determines whether it is necessary to update the drive plan De based on the content of the detected environmental change. When the drive planning unit 313 determines that the update is necessary, the drive plan De is generated again, and the regenerated drive plan De is transmitted to the parking lot server device 400.

The following will describe an operation of the above configuration.

As shown in FIG. 14, in response to the above-described trigger being activated, the parking lot server device 400 of the present embodiment transmits the emergency stop signal to the automobile 300 in S415. After transmitting the emergency stop signal, the parking lot server device 400 transmits the travelling permission signal to the automobile 300 in S416 in response to the event has triggered the emergency stop being recovered. After starting the autonomous driving control according to the drive plan De in S313, the automobile 300 of the present embodiment proceeds to S319 in response to reception of the emergency stop signal transmitted from the parking lot server device 400 in S318. The automobile 300 makes a temporary stop in S319.

When the automobile 300 receives the travelling permission signal transmitted from the parking lot server device 400 in S320, the automobile 300 proceeds to S321. In S321, the automobile 300 determines whether to update the drive plan De based on the content of the detected environmental change in the parking lot and the environment change of the parking lot before and after the emergency stop. Herein, the environment change of the parking lot before and after the emergency stop is included in the travelling permission signal. When the automobile 300 determines that it is necessary to update the drive plan De, the automobile 300 regenerates, in S322, the drive plan De in consideration of the environmental change information. After S322, the process returns to S310, and the automobile 300 transmits the regenerated drive plan De to the parking lot server device 400.

As described above, the parking lot server device 400 of the present embodiment includes the emergency stop unit 407 that transmits the emergency stop signal to the automobile 300. Herein, the emergency signal controls all of the automobiles in the parking to make an emergency stop. The automobile 300 of the present embodiment is provided with an environmental change detection unit 312. The environmental change detection unit 312 detects a change in the environment around the automobile 300, and determines that the environment has changed when the emergency stop signal transmitted from the parking lot server device is received. In the present embodiment, when the environmental change detection unit 312 detects a change in the environment, the drive planning unit 313 regenerates the drive plan De based on the content of the detected change in the environment, and the regenerated drive plan De is transmitted to the parking lot server device 400.

According to the present embodiment, after the autonomous driving control is started based on the generated drive plan De, in response to an occurrence of event in which the AVP cannot be executed normally, the parking lot server device 400 transmits the emergency stop signal to all of the automobiles in the parking lot. When the emergency stop signal is issued, the automobile regenerates the drive plan De corresponding to the environment change in the parking lot before and after the emergency stop. Thus the autonomous driving control corresponding to the environment change in the parking lot can be continuously carried out. In this configuration, the automobile 300 is controlled to maintain a temporary stop state until the drive plan De is regenerated and the regenerated drive plan De is determined by the drive plan verification unit 406 of the parking lot server device 400 to be appropriate. Thus, travelling control safety can be secured.

Other Embodiments

The present disclosure is not limited to the embodiments that have been described above and illustrated in the drawings, but can arbitrarily be modified, combined, or expanded without departing from the spirit of the present disclosure. The numerical values and the like shown in each of the above embodiments are merely examples, and the present disclosure is not limited thereto.

As described in each of the above embodiments, the automobile 300 can securely generate the drive plan De which forbids the automobile 300 to go out of the parking lot based on the map information around the parking lot provided by the map server device 500 and the valid range information Dg indicating the valid range within the parking lot and outside of the parking lot. As another example, the AVP system 100 may be configured to not include the map server device 500. In this configuration, the drive planning unit 306, 311, 313 of the automobile 300 may generate the drive plan De based on the parking lot map information provided by the parking lot server device 400. In this configuration, the automobile 300 can securely generate the drive plan De which forbids the automobile 300 to go out of the parking lot.

Although the present disclosure has been described with reference to exemplary embodiments, it is understood that the present disclosure is not limited to such exemplary embodiments and structures. The present disclosure incorporates various modifications and variations within the scope of equivalents. In addition, various combinations and configurations, as well as other combinations and configurations that include only one element, more, or less, are within the scope and spirit of the present disclosure.

The controller and the method thereof described in the present disclosure are implemented by a dedicated computer provided by configuring a processor and a memory programmed to execute one or more functions embodied by a computer program. Alternatively, the control circuit described in the present disclosure and the method thereof may be realized by a dedicated computer configured as a processor with one or more dedicated hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. Further, the computer program may be stored in a computer-readable non-transitory tangible storage medium as instructions executed by a computer.

What is claimed is:

1. An autonomous valet parking system executing a valet parking by an autonomous driving control, the autonomous valet parking system comprising:
   a terminal device;
   a vehicle; and
   a server device installed to a parking lot,
   wherein
   the terminal device, the vehicle, and the server device are configured to transmit and receive data to and from one another,
   the terminal device includes a key request verification unit and a temporary key generation unit,
   the vehicle includes a key verification unit, a drive planning unit, and an autonomous driving control unit,
   the server device includes a key request generation unit, a parking position determination unit, and a plan verification unit,
   the key request generation unit generates a temporary key request requesting the terminal device to generate a temporary key and transmits the temporary key request to the terminal device,
   in response to a reception of the temporary key request transmitted from the server device, the key request verification unit verifies the temporary key request,
   the temporary key generation unit generates the temporary key in response to a verification result of the temporary key request by the key request verification unit being true, and transmits the temporary key to the vehicle and the server device,
   in response to a reception of the temporary key transmitted from the terminal device, the parking position determination unit determines a target parking position of the vehicle, and transmits, to the vehicle, the temporary key and target position information indicating the determined target parking position,
   in response to a reception of the temporary keys transmitted from the terminal device and the server device, the key verification unit verifies the temporary key transmitted from the terminal device and the temporary key transmitted from the server device,
   in response to verification results of the temporary keys by the key verification unit being true, the drive planning unit generates a drive plan including a route to the target parking position based on the target position information, and transmits the drive plan to the server device,
   in response to a reception of the drive plan transmitted from the vehicle, the plan verification unit verifies whether the drive plan is available, and the plan verification unit transmits, to the vehicle, available information indicating that the drive plan is available when the drive plan is verified to be available, and
   in response to a reception of the available information transmitted from the server device, the autonomous driving control unit executes the autonomous driving control of the vehicle according to the drive plan generated by the drive planning unit.

2. The autonomous valet parking system according to claim 1, wherein
the plan verification unit generates correction information instructing a correction of the drive plan when the drive plan is verified to be not available, and transmits, to the vehicle, unavailable information indicating that the drive plan is not available together with the correction information, and
when the drive planning unit receives the correction information and the unavailable information transmitted from the server device, the drive planning unit regenerates the drive plan based on the correction information, and transmits the regenerated drive plan to the server device.

3. The autonomous valet parking system according to claim 1, wherein
the vehicle further includes an environmental change detection unit that detects a change in an environment around the vehicle, and
in response to the environmental change detection unit detecting the change in the environment, the drive planning unit regenerates the drive plan based on a content of the detected change in the environment, and transmits the regenerated drive plan to the server device.

4. The autonomous valet parking system according to claim 3, wherein
the vehicle further includes an object detection unit that detects an object existing around the vehicle,
the target position information transmitted from the parking position determination unit includes map information of the parking lot, and
the environmental change detection unit determines the change in the environment in response to the object detection unit detecting an existence of object that hinders a travelling of the vehicle and is not included in the map information of the parking lot.

5. The autonomous valet parking system according to claim 3, wherein
the server device further includes an emergency stop unit that transmits, to the vehicle, an emergency stop signal instructing an emergency stop in the parking lot, and
in response to a reception of the emergency stop signal from the server device, the environmental change detection unit determines the emergency stop signal as the change in the environment.

6. The autonomous valet parking system according to claim 1, wherein
the plan verification unit verifies the drive plan is available under a first condition that the drive plan does not guide the vehicle toward outside of the parking lot.

7. The autonomous valet parking system according to claim 6, wherein
the plan verification unit verifies the drive plan is available under a second condition that a difference between a target position of the drive plan set by the vehicle and the target parking position determined by the parking position determination unit of the server device is smaller than a predetermined threshold.

8. The autonomous valet parking system according to claim 6, wherein
the plan verification unit verifies the drive plan is available under a third condition that a traveling direction of the vehicle defined in the drive plan conforms to a designated traveling direction in the parking lot.

9. The autonomous valet parking system according to claim 1, further comprising
a map server device,
wherein
the map server device includes a valid range acquisition unit that acquires valid range information indicating a valid range of the temporary key,
the vehicle further includes a range request generation unit,
the range request generation unit generates a range information request that requests the map server device to transmit the valid range information, and transmits the range information request to the map server device,
in response to a reception of the range information request transmitted from the vehicle, the valid range acquisition unit acquires the valid range information and transmits the valid range information to the vehicle, and
in response to a reception of the valid range information, the drive planning unit generates the drive plan with consideration of the valid range information.

10. An autonomous valet parking program product, which is stored in a computer-readable non-transitory storage medium and executed by a terminal device, a vehicle, and a server device installed to a parking lot to provide a valet parking service by an autonomous driving control of the vehicle, the terminal device, the vehicle, and the server device being configured to transmit and receive data from one another,
the autonomous valet parking program product comprising instructions for:
executing, by the terminal device, a key request verification procedure and a temporary key generation procedure;
executing, by the vehicle, a key verification procedure, a drive planning procedure, and an autonomous driving control procedure; and
executing, by the server device, a key request generation procedure, a parking position determination procedure, and a plan verification procedure,
wherein,
in the key request generation procedure, the server device generates a temporary key request requesting the terminal device to generate a temporary key and transmits the temporary key request to the terminal device,
in the key request verification procedure, the terminal device verifies the temporary key request in response to a reception of the temporary key request transmitted from the server device,
in the temporary key generation procedure, the terminal device generates a temporary key in response to a verification result of the temporary key request being true, and transmits the temporary key to the vehicle and the server device,
in the parking position determination procedure, the server device determines a target parking position of the vehicle in response to a reception of the temporary key transmitted from the terminal device, and transmits, to the vehicle, the temporary key and target position information indicating the determined target parking position,
in the key verification procedure, the vehicle verifies the temporary key transmitted from the terminal device and the temporary key transmitted from the server device in response to a reception of the temporary keys,
in the drive planning procedure, the vehicle generates a drive plan including a route to the target parking position based on the target position information in response to verification results of the temporary keys being true, and transmits the drive plan to the server device, in the plan verification procedure, the server device verifies whether the drive plan is available in response to a reception of the drive plan transmitted from the vehicle, and transmits, to the vehicle, available information indicating the drive plan is available when the drive plan is verified to be available, and in the autonomous driving control procedure, the vehicle executes the autonomous driving control of the vehicle according to the drive plan in response to a reception of the available information transmitted from the server device.

11. A method of autonomous valet parking comprising:

generating, with a server device, a temporary key request requesting a terminal device to generate a temporary key and transmitting the temporary key request to the terminal device;

verifying, with the terminal device, the temporary key request in response to a reception of the temporary key request transmitted from the server device;

generating, with the terminal device, a temporary key in response to a verification result of the temporary key request being true, and transmitting the temporary key to the vehicle and the server device;

determining, with the server device, a target parking position of the vehicle in response to a reception of the temporary key transmitted from the terminal device, and transmitting, to the vehicle, the temporary key and target position information indicating the determined target parking position;

verifying, with the vehicle, the temporary key transmitted from the terminal device and the temporary key transmitted from the server device in response to a reception of the temporary keys;

generating, with the vehicle, a drive plan including a route to the target parking position based on the target position information in response to verification results of the temporary keys being true, and transmitting the drive plan to the server device;

verifying, with the server device, whether the drive plan is available in response to a reception of the drive plan transmitted from the vehicle, and transmitting, to the vehicle, available information indicating the drive plan is available when the drive plan is verified to be available; and executing, with the vehicle, the autonomous driving control of the vehicle according to the drive plan in response to a reception of the available information transmitted from the server device.

\* \* \* \* \*